US011250587B2

(12) United States Patent
Zhu et al.

(10) Patent No.: US 11,250,587 B2
(45) Date of Patent: Feb. 15, 2022

(54) HELIOSTAT ERROR DETECTION

(71) Applicant: Alliance for Sustainable Energy, LLC, Golden, CO (US)

(72) Inventors: Guangdong Zhu, Englewood, CO (US); Rebecca Amelia Mitchell, Boulder, CO (US)

(73) Assignee: Alliance for Sustainable Energy, LLC, Golden, CO (US)

(*) Notice: Subject to any disclaimer, the term of this patent is extended or adjusted under 35 U.S.C. 154(b) by 0 days.

(21) Appl. No.: 17/034,660

(22) Filed: Sep. 28, 2020

(65) Prior Publication Data

US 2021/0110571 A1 Apr. 15, 2021

Related U.S. Application Data

(60) Provisional application No. 62/959,369, filed on Jan. 10, 2020, provisional application No. 62/906,880, filed on Sep. 27, 2019.

(51) Int. Cl.

| | |
|---|---|
| ***G06T 7/73*** | (2017.01) |
| ***G05D 3/10*** | (2006.01) |
| ***G06T 7/60*** | (2017.01) |
| ***G06K 9/46*** | (2006.01) |
| ***G06K 9/62*** | (2006.01) |

(52) U.S. Cl.

CPC ............... *G06T 7/73* (2017.01); *G05D 3/105* (2013.01); *G06K 9/4671* (2013.01); *G06K 9/6268* (2013.01); *G06T 7/60* (2013.01); *G06T 2207/10032* (2013.01)

(58) Field of Classification Search

CPC ... G06T 7/73; G06T 7/60; G06T 2207/10032; G05D 3/105; G06K 9/4671; G01C 11/00

See application file for complete search history.

(56) References Cited

U.S. PATENT DOCUMENTS

| | | | | |
|---|---|---|---|---|
| 5,862,799 | A | 1/1999 | Yogev et al. | |
| 8,582,092 | B1 * | 11/2013 | Yellowhair ............. | F24S 23/74 356/138 |
| 8,651,100 | B2 | 2/2014 | Pfahl et al. | |
| 9,222,702 | B2 * | 12/2015 | Goldberg ................ | F24S 50/20 |
| 2008/0236568 | A1 * | 10/2008 | Hickerson ............. | F24S 30/452 126/578 |
| 2010/0031952 | A1 * | 2/2010 | Zavodny ............... | G01S 3/7861 126/573 |

(Continued)

OTHER PUBLICATIONS

Prahl, Stanicki, B., Hilgert, C.. Ulmer, S,, and Reiger, M., 2011. “Airborne shape measurement of parabolic trough collector fields”. In Proceedings of the 17th SolarPACES Int’l Symposium. (Year: 2011).*

(Continued)

*Primary Examiner* — Michael Robert Cammarata
(74) *Attorney, Agent, or Firm* — Alexandra M. Hall

(57) ABSTRACT

The present disclosure describes non-intrusive optical (NIO) characterization methods which efficiency measures optical errors (such as mirror surface slope error, mirror canting error, and heliostat tracking error) of a heliostat field. The methods utilize photogrammetry and deflectometry to analyze an image taken of a heliostat to determine optical errors and increase the amount of solar energy delivered by the heliostat to the receiver.

16 Claims, 30 Drawing Sheets

(56) References Cited

U.S. PATENT DOCUMENTS

| | | | | |
|---|---|---|---|---|
| 2010/0252024 A1* | 10/2010 | Convery | F24S 50/20 126/578 |
| 2013/0021471 A1* | 1/2013 | Waterhouse | F24S 50/20 348/139 |
| 2016/0069817 A1* | 3/2016 | Zavodny | G01N 21/8851 356/445 |
| 2018/0299264 A1* | 10/2018 | Hines | F24S 50/20 |
| 2019/0086122 A1* | 3/2019 | You | F24S 80/00 |
| 2019/0162449 A1* | 5/2019 | Sun | F24S 80/00 |

OTHER PUBLICATIONS

S. Li, J. Xu, J. Lou, X. Yang, H. Liu and S. Chen, "Mirror Surface Assessment in Solar Power Applications by 2-D Coded Light," in IEEE Transactions on Instrumentation and Measurement, vol. 69, No. 6, pp. 3555-3565, Jun. 2020, doi: 10.1109/TIM.2019.2937529. (Year: 2020).*

Sproul, E, Chavez, et al. "The Development of the Heliostat Focusing and Canting Enhancement Technique" Proc, of the ASME 2011 5th Int'l Conf, on Energy Sustainability. Washington, DC, USA. Aug. 7-10, 2011. pp. 611-619. (Year: 2011).*

Yellowhair, J, & Ho, CK. "Heliostat Canting and Focusing Methods: An Overview and Comparison." Proc, of the ASME 2010 4th Int'l Conf. on Energy Sustainability, vol. 2. Phoenix, Arizona, USA. May 17-22, 2010. pp. 609-615. (Year: 2010).*

Pottier, K., Liipfert, E., Johnston, G., Shortis, M., 2005. Photogrammetry: a powerful tool for geometric analysis of solar concentrators and their components. J. Solar Energy Eng. 127 (1), 94-101. (Year: 2005).*

Roger, M., Prahl, C., Uhner, S., 2008. Fast determination of heliostat shape and orientation by edge detection and photogrammetry. In: Proceedings of the 14th Biennial CSP SolarPACES Symposium, Las Vegas, NV, Mar. 4-7, 2008. (Year: 2008).*

Ulmer, S. et al., 2011. Automated high resolution measurement of heliostat slope errors. Solar Energy 85 (2011), 681-687. (Year: 2011).*

"Solar Reserve—Heliostats and Field Controls Collector", available at https://www.energy-xprt.com/products/solarreserve-heliostats-and-field-controls-collector-416661, accessed on Sep. 10, 2021, pp. 1-2.

Andraka et al., "Rapid Reflective Facet Characterization Using Fringe Reflection Techniques", Journal of Solar Energy Engineering, Feb. 2014, vol. 136, pp. 011002-1-011002-11.

Arqueros et al., "A novel procedure for the optical characterization of solar concentrators", Solar Energy, 2003, vol. 75, pp. 135-142.

Khalsa et al., "An Automated Method to Correct Heliostat Tracking Errors", SolarPACES 2011, Granada, Spain, Sep. 20-23, 2011, SAND2011-5741C, pp. 1-10.

King, "Beam Quality and Tracking Accuracy Evaluation of Second-Generation and Barstow Production Heliostats", Sandia Report SAND82-0181, Aug. 1982, pp. 1-129.

Nguyen et al., "Single-shot deflectometry for dynamic 3D surface profile measurement by modified spatialcarrier frequency phase-shifting method", Nature—Scientific Reports, 2019, vol. 9, No. 3157, pp. 1-15.

Mitchell et al., "A non-intrusive optical (NIO) approach to characterize heliostats in utility-scale power tower plants Methodology and in-situ validation", Solar Energy, Oct. 2020, vol. 209, pp. 431-445.

Peaker, "Photogrammetry Background and Methods", Dec. 6, 2018, available at https://digitalscholarship.blogs.brynmawr.edu/photogrammetry-background-and-methods/, accessed on Sep. 23, 2020, pp. 1-34.

Röger et al., "Heliostat Shape and Orientation by Edge Detection", Journal of Solar Energy Engineering, May 2010, vol. 132, pp. 021002-1-021002-7.

Sattler et al., "Review of heliostat calibration and tracking control methods", Solar Energy, 2020, vol. 207, pp. 110-132.

Stynes et al., "Slope Error Measurement Tool for Solar Parabolic Trough Collector", Conference Paper BREL/CP-5500-54636, 2012 World Renewable Energy Forum, Denver, Colorado May 13-17, 2012, pp. 1-10.

Ulmer et al., "Automated high resolution measurement of heliostat slope errors", Solar Energy, Apr. 2011, vol. 85, No. 4, pp. 681-687.

Zhu, "A Sensitivity Study on a Non-Intrusive Optical (NIO) Method to Measure Optical Errors of Heliostats in Utility-Scale Power Tower Plants", SolarPACES at Daegu, South Korea, Oct. 1, 2019, pp. 1-24.

* cited by examiner

HELIOSTAT ERROR DETECTION

CROSS-REFERENCE TO RELATED APPLICATIONS

This application claims priority to U.S. Provisional Patent Application No. 62/906,880 filed on Sep. 27, 2019 and U.S. Provisional Patent Application No. 62/959,369 filed on Jan. 10, 2020, the contents of which are incorporated herein by reference in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

Concentrating solar power (CSP) is a solar technology that converts solar energy into thermal energy and, if needed, into electricity through a thermodynamic cycle. In power tower CSP systems, a collection of heliostats (known as a heliostat field) focus sunlight onto a receiver on a tower. The heliostats track the sun in two axes and concentrate sunlight to the fixed receiver. A heat-transfer fluid is heated in the receiver and is used to heat a working fluid. The working fluid is then used in a turbine generator to produce electricity. Each heliostat is made up of a plurality of mirrors.

Optical errors of heliostats in the field greatly impact the optical efficiency of the power-tower system, and, ultimately, the amount of solar power intercepted and absorbed by the receiver. Measuring solar field optical error is important for product improvement, operation, and maintenance in CSP. Heliostat field operations and maintenance is a particularly challenging issue due to the large number of individually tracking heliostats. Existing optical characterization methods include beam characterization systems, deflectometry methods, celestial-body-based reflective imaging, and distant photogrammetry. Currently, no reliable in-situ optical characterization tool is available that can efficiently and accurately measure various optical errors of individual heliostats in a utility-scale power-tower plant. These current optical characterization methods focus on error of individual heliostats (such as aiming error or mirror position error), have low accuracy (they use one image to determine a tracking measurement for the entire field), and low efficiency (it may take weeks or even months to survey an entire field). Thus, there remains a need for a method to determine optical errors efficiently and accurately in a heliostat field.

SUMMARY

An aspect of the present disclosure is a method for increasing solar energy delivered to a receiver by a heliostat, the method including capturing an image of a reflection of the receiver in a mirror of the heliostat using a camera having a position, calculating an optical error of the heliostat based on the image and the position of the camera, and adjusting the heliostat to deliver more solar energy to the receiver based on the optical error, where the optical error includes at least one of a slope error, a canting error, or a tracking error, and the adjusting minimizes the optical error and increases the solar energy delivered to the receiver. The adjusting may orient the heliostat towards the receiver. In some embodiments, the calculating also includes identifying a feature in the image. The feature may be a corner of the heliostat in the image and/or the reflection of the receiver. In some embodiments, the method also includes determining the position of the camera, where the determining includes defining a coordinate system based on the corner of the heliostat, and using collinearity equations in the coordinate system to solve for the position of the camera. In some embodiments, the identifying includes mapping a plurality of pixels comprising the image in physical space, sorting the plurality of pixels into a first class and a second class, scanning the plurality of pixels to determine a location where a pixel of the first class is adjacent to a pixel of the second class, and identifying the location as the feature. In some embodiments, the image is in greyscale, the first class comprises pixels which are black, and the second class comprises pixels which are white. In some embodiments, the optical error is slope error and the calculating includes identifying a first point along the feature, calculating a first normal vector from the point with the mirror at a first orientation, determining a second orientation of the mirror, calculating a second normal vector from a second point on the second orientation of the mirror, and comparing the first normal vector and the second normal vector to determine the slope error. In some embodiments, the optical error is canting error and the calculating includes determining the slope error for a plurality of points on the mirror and averaging the slope error for the plurality of points to determine the canting error. In some embodiments, the optical error is tracking error and the calculating comprises, comparing the canting error of the mirror to the second orientation to determine a tracking error. In some embodiments, the adjusting is approximately equivalent to the tracking error.

An aspect of the present disclosure is a system for maximizing the solar energy delivered to a receiver by a heliostat, the system including the receiver which includes a feature, the heliostat includes a mirror having a first orientation relative to the receiver, a camera configured to obtain an image of the mirror, and a processor configured to receive the image and calculate an optical error of the heliostat based on the image, where the image includes a reflection of the feature in the mirror, the optical error includes at least one of a slope error, a canting error, or a tracking error, and the processor is configured to adjust the heliostat to a second orientation to minimize the optical error, resulting in the heliostat delivering more solar energy to the receiver. An unmanned aerial vehicle may be configured to support the camera. In some embodiments, the mirror includes a corner, and the processor is configured to locate the corner in the image, define a coordinate system based on the corner; and use collinearity equations to determine a position of the camera. In some embodiments, the processor is configured to identify a point along the reflection of the feature, calculate a first normal vector from the point with the mirror at a first orientation, determine a second orientation of the mirror, calculate a second normal vector from the second orientation of the mirror, and compare the first normal vector and the second normal vector to determine the slope error. In some embodiments, the processor is configured to calculate the slope error at a plurality of points on the mirror and average the slope error for the plurality of points to determine the canting error. In some embodiments, the processor is configured to compare the canting error to the first orientation to determine the tracking error.

BRIEF DESCRIPTION OF THE DRAWINGS

Exemplary embodiments are illustrated in the referenced figures of the drawings. It is intended that the embodiments and figures disclosed herein are considered to be illustrative rather than limiting.

REFERENCE NUMERALS

Figure 1:
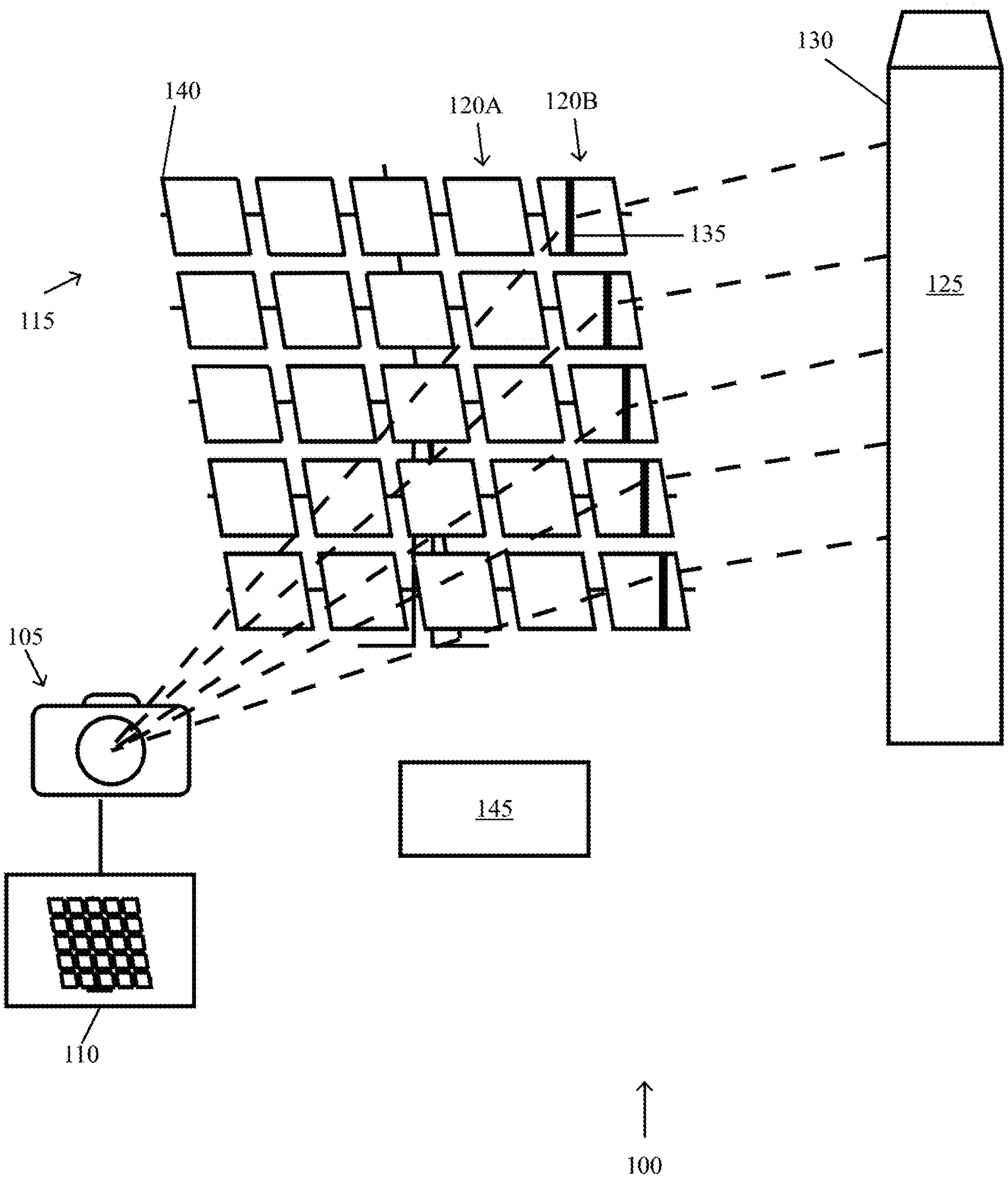
FIG. 1 illustrates a system for determining heliostat optical errors according to some embodiments of the present disclosure.

100 . . . system
105 . . . camera
110 . . . image
115 . . . heliostat
120 . . . mirror
125 . . . tower
130 . . . tower edge
135 . . . reflected tower edge
140 . . . corner of heliostat
145 . . . processor
200 . . . method
205 . . . preparing
210 . . . capturing
215 . . . identifying
220 . . . determining
225 . . . calculating
230 . . . updating

DETAILED DESCRIPTION

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

The present disclosure relates a system and method of using the system to determine optical error in a heliostat field using photogrammetry techniques. Photogrammetry includes determining the shape, size, and/or location of an object from a photograph of the object. In a heliostat field, the tower and/or receiver is reflected in each mirror. The present disclosure utilizes the distortions in the tower and/or receiver reflection (as identified in a photograph) to determine optical errors. The present disclosure describes a non-intrusive optical (NIO) characterization tool capable of determining heliostat field optical errors without interrupting operation of the heliostat field.

Optical errors determined by the present disclosure may include surface slope error ("slope error"), mirror canting error ("canting error"), and/or heliostat tracking error ("tracking error"). Slope error is determined for an individual point on a mirror surface and indicates how the mirror surface deviates from its desired shape. Canting error is determined for an entire mirror and indicates how the mirror orientation deviates from its desired orientation. Tracking error is determined for an entire heliostat and indicates how the heliostat orientation deviates from its desired orientation.

FIG. 1 illustrates a system 100 for determining heliostat optical errors according to some embodiments of the present disclosure. The system 100 includes a camera 105, a heliostat 115, a processor 145, and a tower 125 with a tower edge 130. The camera 105 captures an image 110 of the tower 125 and the tower edge 130, as reflected in an individual mirror 120 of the heliostat 115. This reflection of the tower edge 130 is referred to herein as the reflected tower edge 135, as shown in FIG. 1. The heliostat 115 has a corner 140.

In some embodiments of the present disclosure, and as shown in FIG. 1, a heliostat 115 may be a "mini-facet" heliostat having a large heliostat frame with multiple mirrors 120A-B, each individually actuated but with a limited range of independent movement. In some embodiments of the present disclosure, a heliostat 115 may have a single mirror 120 making up the entire heliostat (not shown). A tower 125 may be a power-tower structure positioned in a field of heliostats 115 and may be approximately cylindrical in shape, approximately rectangular in shape, or have components with both cylindrical and rectangular shapes. The tower edge 130 may be a border of a rectangular face of the tower 125 or may be a border of a curved (i.e., cylindrical) face of the tower 125. The reflected tower edge 135 is the reflection of the tower edge 130 in the mirror 120. The reflected tower edge 135 may also include the reflection of the tower 125 in the mirror 120. The tower edge 130 may be distorted when it appears as the reflected tower edge 135 in the mirror 120, and these distortions may be used to determine both the camera 105 position and the tower 125 position, as described herein.

A mirror 120 may be approximately rectangular, cylindrical, or circular in shape. A mirror 120 may be approximately planar or convex (i.e., curved). A corner 140 of a heliostat 115 may be the external angle of the upper-most or lower-most mirror 120. That is, the corner 140 may be a feature of both the heliostat 115 and of a mirror 120, although for the method described herein its used primarily as a feature of the heliostat 115. A heliostat 115 may have multiple corners 140 (typically 4), based on the shape of the heliostat 115. In some embodiments, the corner 140 may be an approximately right angle (i.e., 90°). In other embodiments, the corner 140 may be approximately obtuse (i.e., greater than 90°) or acute (i.e., less than 90°).

The camera 105 may be a digital camera, such as a digital single lens reflex (DSLR) camera, a mirrorless camera, a point and shoot camera, a smartphone, a tablet, a bridge camera, a medium format camera, a film camera, and/or an instant camera. The camera 105 may be capable of capturing high-resolution images 110. The image 110 may include a color image, a greyscale image, and/or a black and white image. The image 110 may be a digital image (such as .jpg, .png, or .pdf) or may be a physical image, such as a printed photograph. In some embodiments of the present disclosure, the image 110 may include a video recording, motion capture images, or rapid-fire photographs. In some embodiments of the present disclosure, multiple cameras 105 may be used to collect a plurality of images 110.

Figure 2:
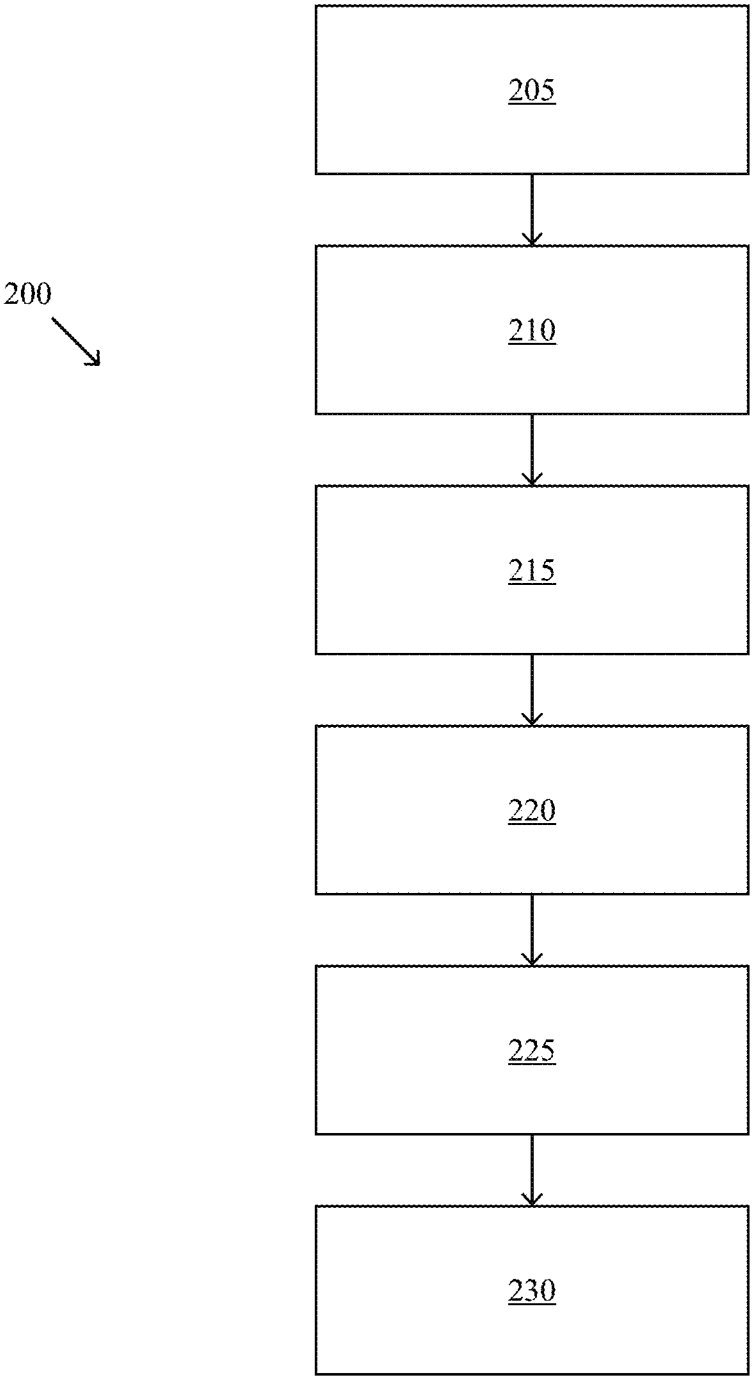
FIG. 2 illustrates a method for determining heliostat optical errors according to some embodiments of the present disclosure.

FIG. 2 illustrates a method 200 for determining heliostat optical errors according to some embodiments of the present disclosure, utilizing a system 100 like that shown in FIG. 1. This exemplary method 200 begins with preparing 205 the camera 105. Preparing 205 the camera 105 may include performing a camera 105 calibration and/or removing any lens distortion. Preparing 205 the camera 105 may include mounting the camera 105 on an unmanned aerial vehicle (UAV), jib, crane, and/or boom. In some embodiments, the camera 105 may be mounted on (i.e., transported by) a UAV, and preparing 205 the camera 105 may include programming a flight pattern into the UAV.

The method 200 may then proceed with capturing 210 an image 110 using the camera 105. To capture an image 110 of the reflected tower edge 135, a camera 105 may be positioned between the tower 125 and the heliostat 115. During the capturing 210, the image 110 may be sent to a processor, which may also store the image 110.

To perform the capturing 210, a camera 105 may be operated manually or preprogrammed. During the capturing 210, the camera 105 may be positioned on a UAV, jib, crane, boom, or may be hand-held, as described above. In some embodiments, the capturing 210 may be done when the camera 105 is mounted on a UAV. The UAV's flight path may be pre-configured such that the camera 105 can efficiently collect the images 110 of the tower 125 reflected in the mirror 120 on several heliostats 115.

In some embodiments, the capturing 210 may include capturing many images 110 of the heliostat 115 field. Multiple images 110 may be taken of each individual heliostat 115 and/or mirror 120. For example, the capturing 210 may include taking 20-30 photographs of a heliostat 115 and/or individual mirror 120.

Referring again to FIG. 2, the next step in the method 200 may include identifying 215 features in the image 110, specifically identifying 215 at least one of the corner 140 of the heliostat 115 and/or the reflected tower edge 135. Some embodiments of the present disclosure use only the reflected tower edge 135 to determine the optical error, as described in more detail below. The tower 125 is the target (or receiver) in a heliostat field and the natural focus on the individual heliostats 115. Identifying 215 the corner 140 of a heliostat 115 allows for the boundaries of the heliostat 115 to be identified, and to determine the location of the reflected tower edge 125 in the image 110. The identifying 215 may be performed by a processor. The processor may also be capable of storing the image 110.

The next step in the method 200 may be determining 220 the camera 105 position and the tower 125 position. The camera 105 position may include the location of the camera 105 in the heliostat field and/or the angular orientation of the camera 105 relative to the heliostat 115, tower 125, and/or the ground. Determining 220 the camera 105 position may be done using the design dimensions of the heliostat 115 and the corner 140. The actual position of the tower 125 relative to the heliostat 115 may be obtained from the local field control system or a map of the CSP field. The determining 220 may be performed by a processor.

The next step in the method 200 may include calculating 225 errors, including mirror slope error ("slope error"), mirror canting error ("canting error"), and heliostat tracking error ("tracking error"). Slope error may be calculated along the reflected tower edge 135. The canting error may be calculated for the mirror 120 by averaging the slope error. Calculating 225 optical errors allows the heliostat 115 to be adjusted (or recanted) to reduce or eliminate these errors, resulting in an increase in solar energy delivered to the receiver of the tower 125.

In some embodiments, the calculating 225 may include comparing the image 110 of the reflected tower edge 135 with the known structural geometry of the heliostat field. Initially, the tower edge 125 position relative to the heliostat 115 may be determined by the known heliostat 115 orientation and heliostat field layout in the heliostat field control system. It then may be updated in the later calculations. The image 110 of the tower 125 may then be post-processed to retrieve the heliostat 115 optical errors. For example, in the image 110, distortion of the reflected tower edge 135 (compared to the tower edge 130) in the mirror 120 indicates the existence of slope error and canting error by being a distorted reflection of the tower edge 130. Discontinuity of the reflected tower edge 130 through multiple mirrors 120 indicates canting error. The slope error can be derived from the comparison with the known dimensions of the tower 125 (a fixed location), and the canting error can be measured from the discontinuity of the reflected tower edge 135. The tracking (or pointing) error of the heliostat 115 can be detected from the relative positions of the tower 125, heliostat 115, and camera 105.

In some embodiments, the calculating 225 also includes determining the location of the reflected tower edge 135 would be in the image 110 if no optical errors were present. By comparing the location and shape of two scenarios, the slope error, canting error, and heliostat tracking errors can be readily identified for the entire heliostat 115 surface when the image 110 is collected by the camera 105. Distortions and/or discontinuations in the reflected tower edge 135 may indicate the presence of an optical error and may be used to determine the ideal location of the reflected tower edge 135 if no errors were present.

In some embodiments, the calculating 225 is performed by a processor. The processor may be capable of identifying 215, determining 220, and calculating 225, or these steps may be performed by a series of processors in communication. The processor may be located at the heliostat field or may be at a different location.

The final step in the method 200 is updating 230 the orientation of the heliostat 115. The updating 230 may include correcting the relative tower 125 position by using the canting error of the individual mirror 120. The tower 125 orientation correction then becomes the heliostat 115 tracking error. To confirm, the slope error of the reflected tower edge 135 and the canting error of the mirror 120 may be recalculated.

Surface slope error ($\theta_s$) is a pointwise quantity defined as the angle difference between the real mirror 120 surface unit normal ($\hat{n}_{real}$) and the ideal mirror 120 surface unit normal ($\hat{n}_{ideal}$). That is, slope error is the angle difference between a normal vector extending from the mirror 120 surface and a normal vector extending from the designed mirror 120 surface. The vectors $\hat{n}_{real}$ and $\hat{n}_{ideal}$ are related by a rotation matrix $\mathcal{R}$ (θs), which rotates by the angle θs with respect to a predefined rotation axis:

$$\hat{n}_{real}=R(\theta_s)\hat{n}_{ideal} \tag{1}$$

The rotation matrix may be defined explicitly as follows:

$$\mathcal{R}(\theta)= \begin{bmatrix} (1-C_\theta)r_x^2+C_\theta & (1-C_\theta)r_xr_y-S_\theta r_z & (1-C_\theta)r_xr_z+S_\theta r_y \\ (1-C_\theta)r_xr_y-S_\theta r_z & (1-C_\theta)r_y^2+C_\theta & (1-C_\theta)r_yr_z-S_\theta r_x \\ (1-C_\theta)r_xr_z-S_\theta r_y & (1-C_\theta)r_yr_z+S_\theta r_x & (1-C_\theta)r_z^2+C_\theta \end{bmatrix} \tag{1}$$

where $C_\theta$ and $S_\theta$ are cos θ and sin θ, respectively, and $\hat{r}=(r_x, r_y, r_z)$ is a unit vector that defines the rotation axis. In the case of a heliostat 115 centered at the origin, the horizontal components of the slope error are defined using $\hat{r}=(0, 1, 0)$.

Given the known camera 105 locations $X_c=(x_c, y_c, z_c)$, the tower edge 130 point $X_T=(x_T, y_T, z_T)$, and the corresponding reflected tower edge 125 point on the mirror 120 surface $X_R=(x_R, y_R, z_R)$, Snell's law can be used to determine the slope error. Define the vectors $\hat{c}r$ and $\hat{r}t$ to be unit vectors from the camera 105 to the reflected tower edge 125 point and from the reflected tower edge 125 point to the tower edge 130 point, respectively, such that $$\widehat{cr} = \frac{X_r - X_c}{\|X_r - X_c\|}, \widehat{rt} = \frac{X_t - X_r}{\|X_t - X_r\|}. \tag{2}$$

Then, Snell's law states $$\hat{rt} = \hat{cr} - 2(\hat{n}_{real} \cdot \hat{cr})\hat{n}_{real} \tag{3}$$

Figure 3:
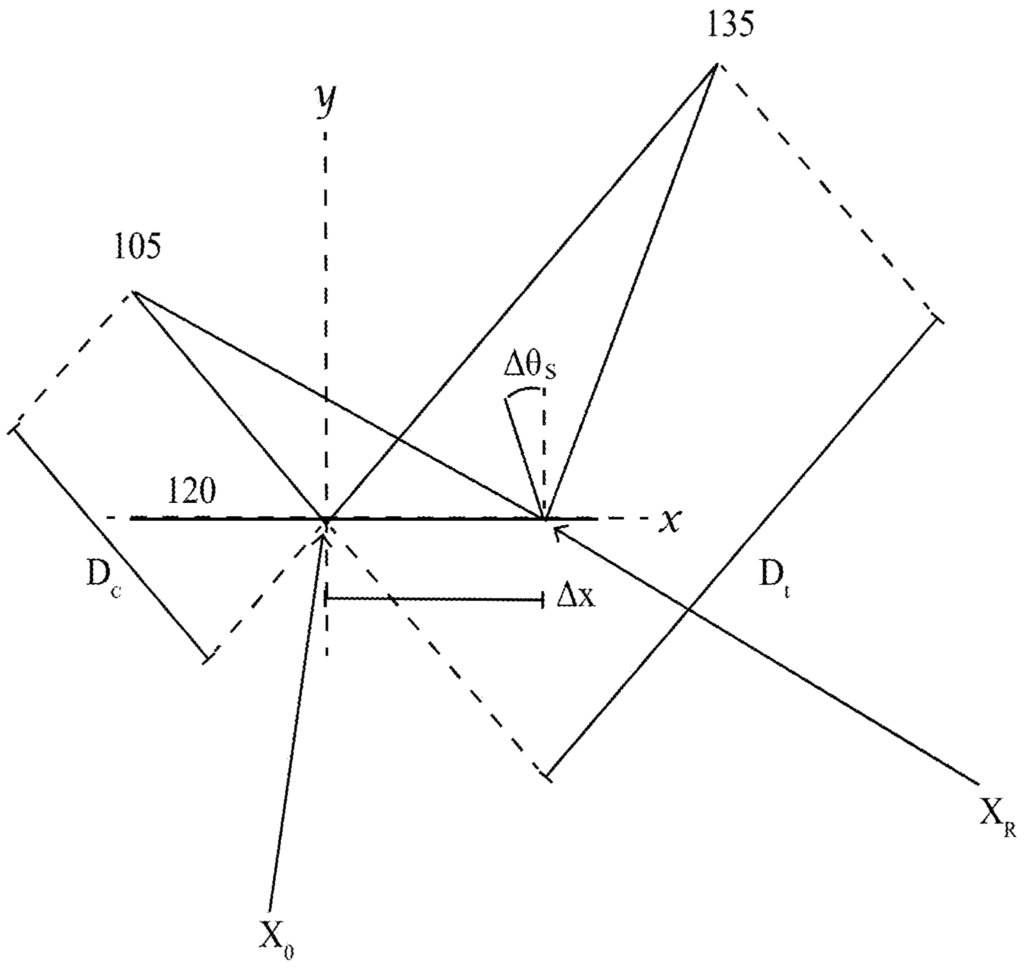
FIG. 3 illustrates a conceptual diagram showing how slope error is affected by the difference between the reflected towed edge point and an ideal reflected tower edge point, according to some embodiments of the present disclosure.

If $X_0=(x_0, y_0, z_0)$ defines the ideal reflected tower edge 125 point with zero slope error, then the slope error can be directly related to the displacement between the points $X_0$ and $X_R(\Delta X_R)$. FIG. 3 shows a conceptual diagram of the relationship between the change in slope error ($\Delta\theta_s$) and $\Delta X_R$. The quantities $D_C$ and $D_T$ describe the distances from the ideal reflected tower edge 135 point to the camera 105 and tower 125, respectively, such that $D_C=\|X_0-X_C\|$ and $D_T=\|X_T-X_0\|$. The angular difference between the calculated mirror facet 120 surface normal and the design mirror facet 120 surface normal is treated as the slope error and it can be calculated by solving the nonlinear equations of Equation (1) and Equation (4).

It should be noted that the reflection point $X_R$ is assumed on the design (ideal) mirror shape. Its deviation from the true surface shape will contribute to measurement uncertainty and its impact can be evaluated to be at a level of 0.01 mrad by using the law of reflection, in some embodiments, due to the (sometimes) long distance between the mirror facet 120 and the tower 125.

The mirror facet canting error ($\theta_C$) is defined for an entire mirror 120 and can be calculated by averaging the slope error of each point over the entire mirror 120 surface. Assuming that slope error is measured at m surface points, the canting error is then:

$$\theta_c = \frac{\sum_{i=1}^{m} \theta_s(i) z_r(i)}{\sum_{i=1}^{m} z_r(i)} \tag{4}$$

where $z_r$, is the z-coordinate of reflection point i. Reflection points should be weighed according to the sampling representation. In some embodiments, if the mirror 120 is curved with horizontal focus set to slant range and floating vertical slant range, the calculation of Equation (5) is done using a weighted mean. This is because due to the curved shape of a mirror 120, points on the mirror 120 surface may not be sampled uniformly. Reflection points on steeper parts of the mirror 120 should be weighted more than reflection points on flatter portions of the mirror 120, as the steeper portions are often underrepresented by images 110. For the purposes of the present disclosure, symmetric curvature of the mirrors 120 is assumed. The weights may be determined based on the ideal mirror 120 paraboloid in the heliostat coordinate system, where f defines the focal length of the mirror:

$$0 = F(x, y, z) = z - \frac{1}{4f}(x^2 + y^2) \tag{5}$$

A weight is defined as the magnitude of the ideal normal vector $\hat{n}_{ideal}=\nabla F(x_i, y_i)$ at a point $(x_i, y_i)$:

$$w(i) = \|\hat{n}_{ideal}\| = \left\|\left(-\frac{x_i}{2f}, \frac{y_i}{2f}, 1\right)\right\| \tag{6}$$

In some embodiments, if the mirror 120 is approximately planar (i.e., relatively flat), Equation (4) becomes a standard mean.

The heliostat tracking error ($\theta_t$) is the error in the orientation of the overall heliostat 115 with respect to its design orientation. It may also be known as heliostat pointing error or heliostat misalignment error. Sources of tracking errors may come from the motor encoder's reference errors, sagging due to gravity, mechanical errors of the rotational mechanism, and systematic canting error. The heliostat tracking error is defined as the difference between the true orientation of a reference mirror 120 and its recorded orientation in the solar field control system. Sometimes the tracking error is also due to discontinuous motor operation to follow the sun.

Figure 4A:
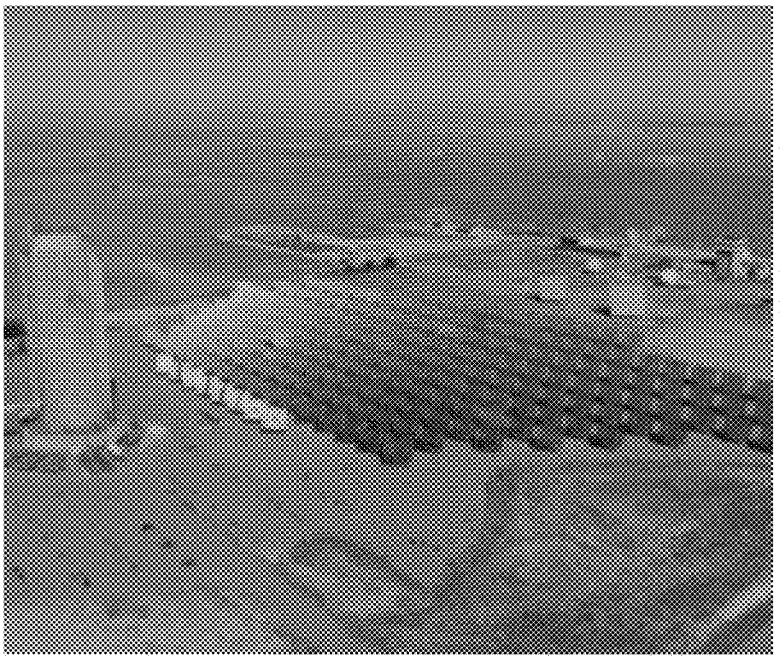
FIG. 4A illustrates an aerial view of the National Solar Thermal Test Facility (NSTTF).
Figure 4B:
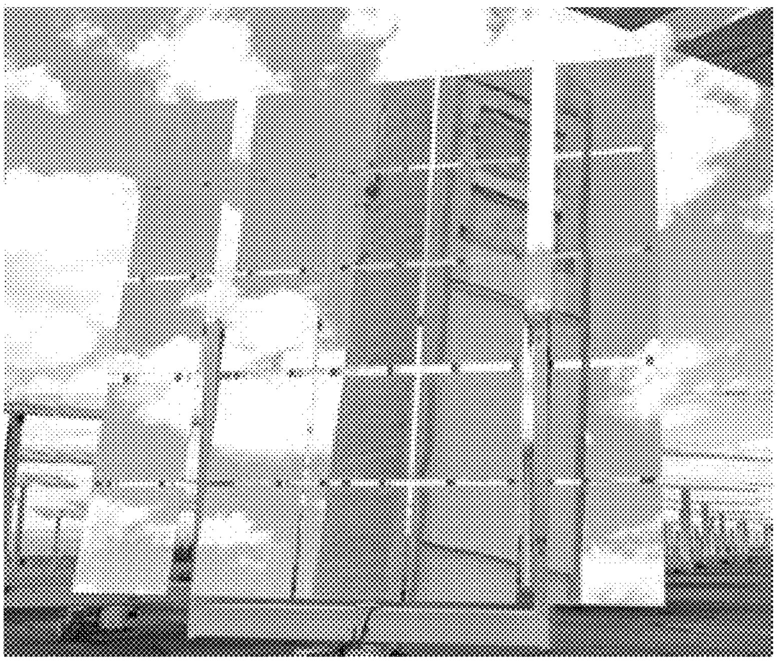
FIG. 4B illustrates one example image taken of a heliostat, according to some embodiments of the present disclosure.

Testing of the present disclosure was performed at the National Solar Thermal Test Facility (NSTTF) of Sandia National Laboratories. FIG. 4A shows an aerial view of the heliostat field at NSTTF. FIG. 4B shows one example of an image 110 of a heliostat 115 taken at NSTTF. The heliostat 115 design dimensions are in Table 1. During this test, a large volume of images 110 were taken at NSTTF. For a single heliostat 115, a full set of images 110 includes images of the reflected tower edge 135 sweeping from the left edge of the heliostat 115 to the right as seen in multiple individual mirrors 120. The images 110 were taken by a hand-held camera 105 on site and collected through both discrete images and a continuous video.

TABLE 1

Geometric specification of the tower structure and heliostat at NSTTF.

| | |
|---|---|
| Number of mirror facet along the horizontal direction | 5 |
| Number of mirror facet along the vertical direction | 5 |
| Mirror facet width | 1.22 m |
| Mirror facet height | 1.22 m |
| Total heliostat width (mirror edge to edge) | 6.81 m |
| Total heliostat height (mirror edge to edge) | 6.35 m |
| Heliostat column spacing between outer columns and inner columns | 0.31 m |
| Heliostat column spacing between inner columns at inner columns | 0.06 m |
| Heliostat vertical mirror space between outer and rows and outer rows and inner rows | 0.06 m |
| Heliostat vertical mirror space between inner rows and inner rows | 0.08 m |

In some embodiments, the camera 105 may initially require calibration and/or determination of the camera 105 position. In some embodiments a software application (such as Photomodeler) may be utilized to calibrate the lens distortion, which can be defined by a series of parameters referred to as $K_{1-3}$ and $P_{1,2}$. After the lens calibration, for a given pixel location for the real sensor, (u', v'), it becomes straightforward to calculate the corresponding coordinates in an ideal sensor, (u,v), with Equations (8)-(10).

$$u=u'+u'(K_1r^2+K_2r^4+K_3r^6)+P_1(r^2+2u'^2)+2P_2u'v' \tag{7}$$

$$v=v'+v'(K_1r^2+K_2r^4+K_3r^6)+P_2(r^2+2v'^2)+2P_1u'v' \tag{8}$$

$$r=\sqrt{u'^2+v'^2}. \tag{9}$$

Now that any lens distortions have been accounted for by converting to ideal sensor locations, the collinearity equations relate the coordinates on the ideal sensor to the corresponding position in actual space, which are given below:

$$u-u_0=-f_C\frac{\mathcal{R}_{11}(x-x_C)+\mathcal{R}_{12}(y-y_C)+\mathcal{R}_{13}(z-z_C)}{\mathcal{R}_{31}(x-x_c)+\mathcal{R}_{32}(y-y_c)+\mathcal{R}_{33}(z-z_c)} \quad (10)$$

$$v-v_0=-f_C\frac{\mathcal{R}_{21}(x-x_C)+\mathcal{R}_{22}(y-y_C)+\mathcal{R}_{23}(z-z_C)}{\mathcal{R}_{31}(x-x_C)+\mathcal{R}_{32}(y-y_C)+\mathcal{R}_{33}(z-z_C)} \quad (11)$$

$$\mathcal{R}=\begin{bmatrix}\cos\varphi\cos\kappa & \sin\omega\sin\varphi\cos\kappa+\cos\omega\sin\kappa & -\cos\omega\sin\varphi\cos\kappa+\sin\omega\sin\kappa\\ -\cos\varphi\sin\kappa & -\sin\omega\sin\varphi\sin\kappa+\cos\omega\cos\kappa & \cos\omega\sin\varphi\sin\kappa+\sin\omega\cos\kappa\\ \sin\varphi & -\sin\omega\cos\varphi\cos\kappa & \cos\omega\cos\varphi\end{bmatrix}. \quad (12)$$

Here, ($u_0$, $v_0$) are the coordinates of the ideal sensor and ($x_C$, $y_C$, $z_C$) and (ω, φ, κ) are the camera physical location and angular orientation, respectively.

Six unknown parameters, i.e., ($x_C$,$y_C$, $z_C$) and (ω, φ, κ), are needed to define the camera 105 position. With four known corner 140 positions of a heliostat 115 (or dimensions of mirrors 120), the collinearity principle gives rise to eight equations by applying coordinates of the four corners 140 to Equations (12) and (13); then, a least-squares method is used to solve for the camera 105 position. This process is shown in FIGS. 5A-C.

Figure 5A:
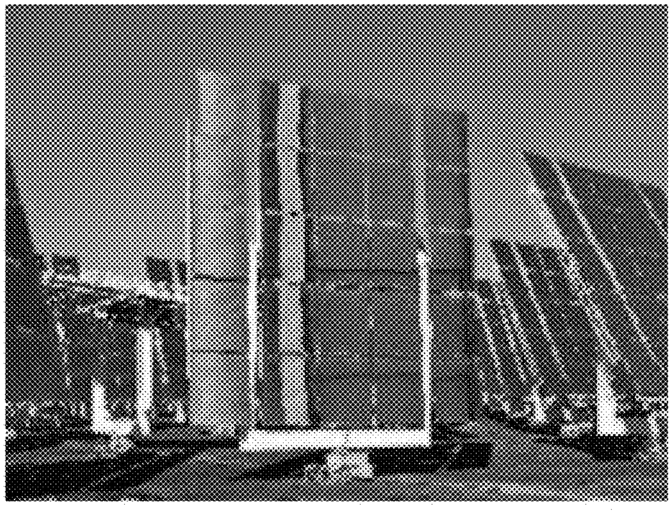
FIG. 5A illustrates an image of a heliostat, according to some embodiments of the present disclosure.
Figure 5B:
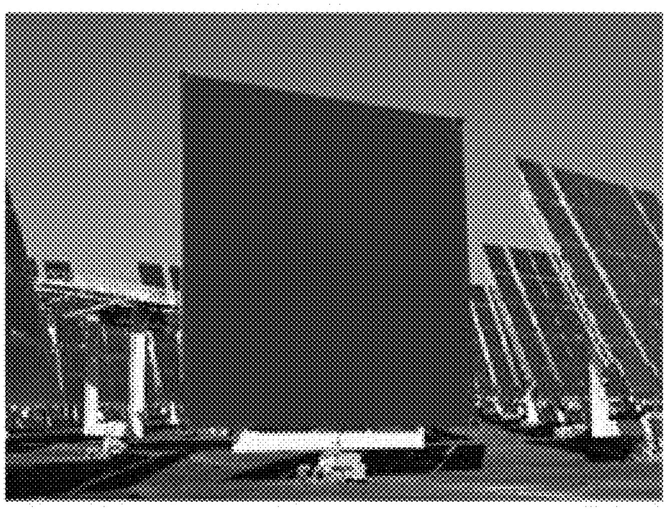
FIG. 5B illustrates how in the image of a heliostat, the corners can be located to identify the boundaries of the heliostat, according to some embodiments of the present disclosure.
Figure 5C:
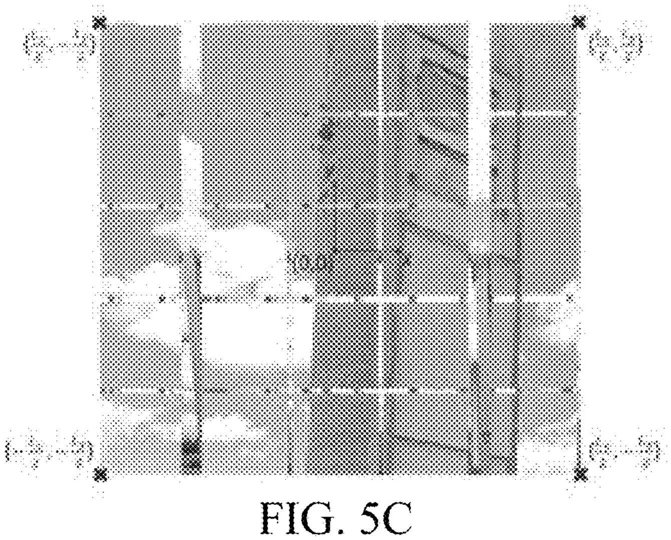
FIG. 5C illustrates how a coordinate system can be defined based on the corners to determine the camera position, according to some embodiments of the present disclosure.

FIG. 5A illustrates an image 110 of a heliostat 115 at NSTTF which was captured 210 by a camera 105, according to some embodiments of the present disclosure. FIG. 5B illustrates how the corners 140 of the heliostat 115 can be identified 215, to identify the boundaries of the heliostat 115, according to some embodiments of the present disclosure. FIG. 5C illustrates how a coordinate system can be defined based on the corners 140 to solve for the camera 105 position, according to some embodiments of the present disclosure.

Once the camera 105 position and orientation parameters are known, Equations (11)-(13) can be used to map all pixel locations to physical space. The heliostat 115 design surface shape will provide an additional constraint to corresponding physical space positions to each pixel of the reflection image. The uncertainty of the camera 105 position relies on the accuracy of the corner 140 detection, which in turn relies on image resolution.

Figure 6A:
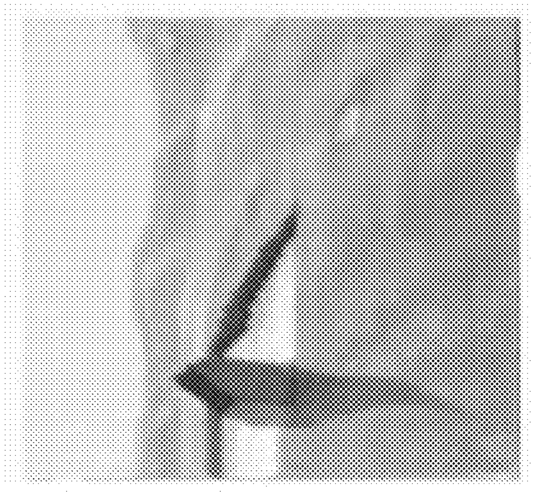
FIG. 6A illustrates an image (originally in color) captured by a camera according to some embodiments of the present disclosure.
Figure 6B:
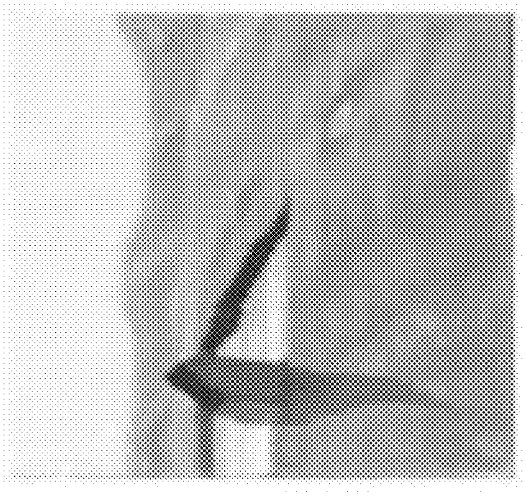
FIG. 6B illustrates the image converted to grayscale according to some embodiments of the present disclosure.
Figure 6C:
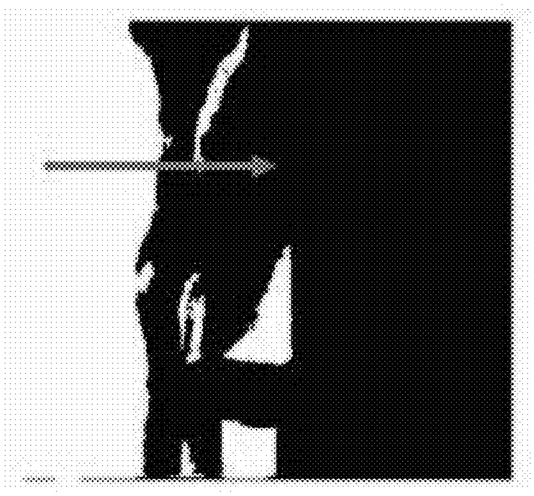
FIG. 6C illustrates the image with pixels converted to black and white classes and analyzed to locate the reflected tower edge, according to some embodiments of the present disclosure.

In some embodiments, the reflected tower edge 135 in the image 110 of the heliostat 115 serves as the reference to calculate the slope error. Any distortions or misalignments in the reflected tower edge 135 are indications of local surface slope errors on the mirror 120. The distortion of the reflected tower edge 135 may vary from one image 110 to another, indicating the variation of surface slope error and canting/misalignment error of individual mirrors 120. In some embodiments, to identify 215 distortions in the reflected tower edge 135, the image 110 may be converted to grey-scale, then individual pixels in the images may be sorted into black and white classes. Then the black and white pixelated image may be scanned horizontally across the image at each pixel row to determine where the pixel class changes to identify the reflected tower edge 135 points. This exemplary process is shown in FIGS. 6A-C. FIG. 6A illustrates an image 110 (originally in color) captured by a camera 105 according to some embodiments of the present disclosure. FIG. 6B illustrates the image 110 converted to grayscale according to some embodiments of the present disclosure. FIG. 6C illustrates the image with pixels converted to black and white classes and analyzed to locate the reflected tower edge 135, according to some embodiments of the present disclosure. When comparing images 110 of different individual mirrors 120A-B, it can be observed that the distortion of the reflected tower edge 135 varies from one mirror 120 to another, indicating the variation of slope error and canting error of mirrors 120.

The location of the reflected towed edge 135 should be calculated for each image 110. The existence of tracking error may create uncertainty in the calculated tower position, but this can be accounted for by a tracking correction step. Using a coordinate system where the heliostat 115 is centered at the origin The tower edge 125 may be fully defined by a vector in the direction of the reflected tower edge 135, $\vec{v}_T=(v_x, v_y, v_z)$ and a reference point along the reflected tower edge 135, $X_{T,0}=(x_{T,0}, y_{T,0}, z_{T,0})$. How $X_{T,0}$ and $\vec{v}_T$, are calculated depends on the tower 125 geometry, the heliostat 115 position and orientation, and the camera 105 position. Known tower 125 dimensions or computer aided design (CAD) data may be used to model the tower 125. For complicated tower 125 geometries, it is important to determine what part of the tower edge 130 corresponds to the reflected tower edge 135 as seen in the image 110. For example, the tower at NSTTF consists of a cylindrical body with front and back rectangular faces and a cylindrical donut "base."

A reflected tower edge 135 can be one of the edges of a rectangular face of the tower 125 or an edge of a cylindrical portion of a tower 125. If the reflected tower edge 135 is one of the rectangular face edges, the calculation of $X_{T,0}$ and $\vec{v}_T$ is relatively straightforward. Any two points, $X_{T,1}$ and $X_{T,2}$ are selected along the relevant edge, and $X_{T,0}$ and $\vec{v}_T$ are defined as:

$$X_{T,0}=X_{T,1} \quad (13)$$

$$\vec{v}_T=X_{T,2}-X_{T,1}. \quad (14)$$

If the reflected tower edge 135 is one of the cylindrical edges, its precise location is where the rays from the reflected tower edge 125 points to the tower edge 130 are tangent to the surface of the tower 125 cylinder. For a given camera position $X_C=(x_C, y_C, z_C)$, consider any point $X_T=(x_T, y_T, z_T)$. The corresponding ideal reflection point $X_R=(x_R, y_R, z_R)$ is found by numerically solving the overdetermined system of equations:

$$\hat{cr}(X_R)=\frac{X_R-X_C}{\|X_R-X_C\|},\ \hat{rt}(X_R)=\frac{X_T-X_R}{\|X_T-X_R\|} \quad (15)$$

$$\hat{rt}(X_R)=\hat{cr}(X_R)-2(\hat{n}_{ideal}\cdot\hat{cr}(X_R))\hat{n}_{ideal} \quad (16)$$

$$0=z_R-\frac{1}{4f}(x_R^2+y_R^2) \quad (17)$$

Equation (16) is the definition of the rays from the camera 105 to the mirror 120 and from the mirror 120 to the tower

125 point as a function of the reflected tower edge 135 point. Equation (17) is the law of reflections. Equation (18) requires the reflection point $X_R$ to lie on the parabolic mirror surface with focal length f. The points $X_T$ and $X_R$ in the heliostat coordinate system are then converted to the equivalent points $\tilde{X}_T$ and $\tilde{X}_R$ in the tower coordinate system (with origin at the center of the tower base and y-axis pointing due north) using translation and rotation operations:

$$\tilde{X}_T = R_{az,el} X_T + \tilde{X}_H \tag{18}$$

$$\tilde{X}_R = R_{az,el} X_R + \tilde{X}_H \tag{19}$$

where $\tilde{X}_H$ is heliostat mirror center point position in the tower coordinate system and $R_{az,el}$ is a rotation matrix consisting of successive rotations about the x and z axes by the heliostat azimuth and elevation angles $\varphi_{az}$, $\varphi_{el}$ respectively. The rotations are defined so that $(\varphi_{az}, \varphi_{el})=(0,0)$ when the heliostat points due north, positive azimuth corrections are applied clockwise, so that the rotation matrix is defined as:

$$R_{az,el} = R_z(\pi - \varphi_{az}) R_x\left(\frac{\pi}{2} - \varphi_{el}\right) = \begin{bmatrix} -\cos\varphi_{az} & -\sin\varphi_{az}\sin\varphi_{el} & \sin\varphi_{az}\cos\varphi_{el} \\ \sin\varphi_{az} & -\cos\varphi_{az}\sin\varphi_{el} & \cos\varphi_{az}\cos\varphi_{el} \\ 0 & \cos\varphi_{el} & \sin\varphi_{el} \end{bmatrix} \tag{20}$$

The reflection-tower ray $\tilde{r}t$ in the tower coordinate system is calculated by applying the second equation of Equation (15) to $\tilde{X}_T$ and $\tilde{X}_R$. In the tower-coordinate system, the tower surface is represented by a cylinder centered about the z-axis so that the surface tangent vector $\tilde{\tau}$ at a tower point $\tilde{X}_T$ on a cross-section ring with fixed height is:

$$\tilde{\tau}(\tilde{X}_T) = (-\tilde{y}_T, \tilde{x}_T, 0) \tag{21}$$

Requiring that $\tilde{\tau}(\tilde{X}_T)$ and $\tilde{r}t$ are equivalent up to a constant yields the equation $$\tilde{x}_T \tilde{r}t_x + \tilde{y}_T \tilde{r}t_y = 0 \tag{22}$$

Figure 7:
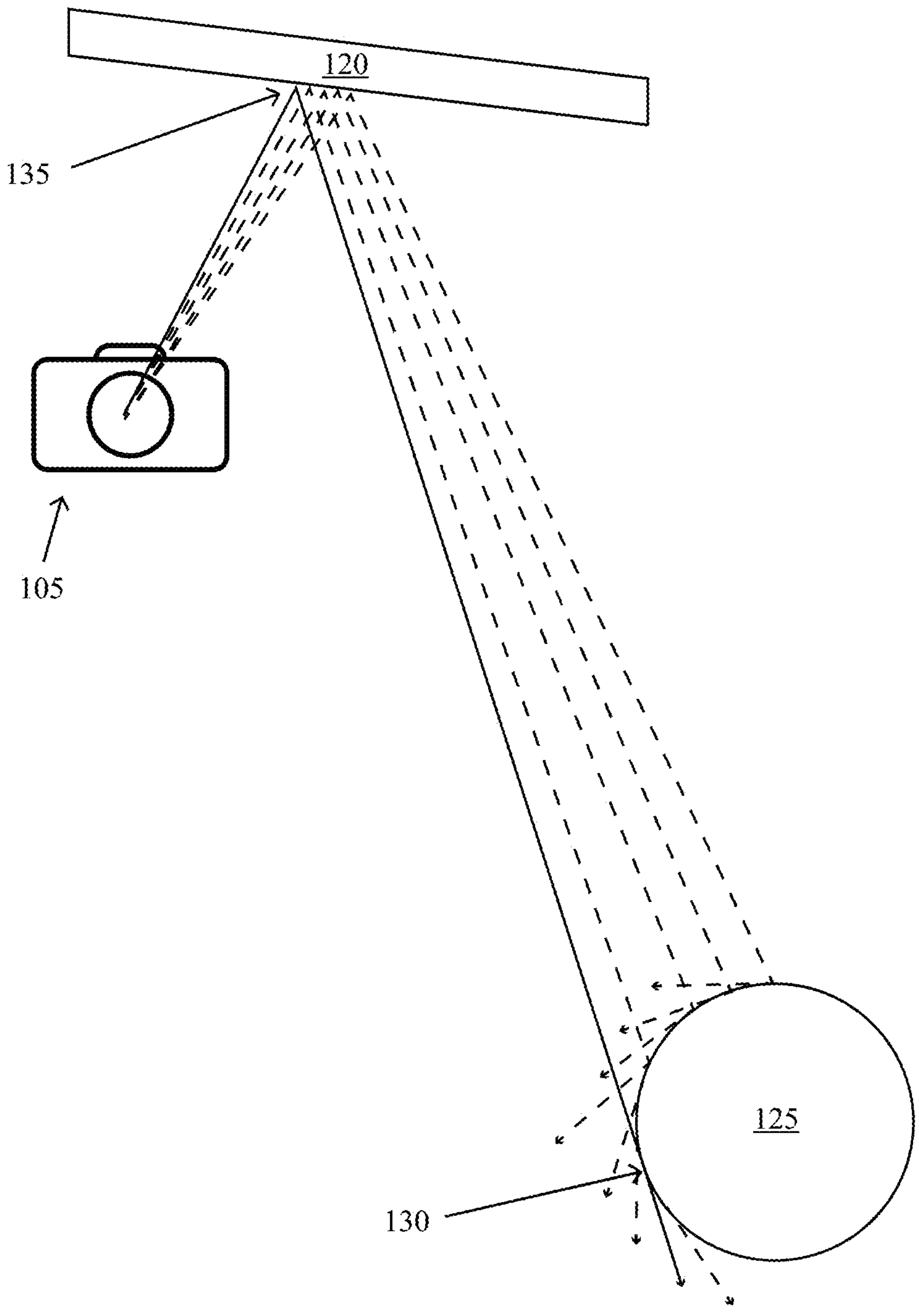
FIG. 7 illustrates a top view of a cylinder tower with a mirror and camera according to some embodiments of the present disclosure.

The true tower edge point can be found by iteratively by searching through all points $X_T$ about the perimeter of the chosen tower cross-section until Equation (21) is satisfied, as illustrated by FIG. 7. After locating two tower distinct edge points, $X_{T,1}$ and $X_{T,2}$ for two cross-sections at two distinct heights of the tower, enough information is known to calculate $X_{T,0}$ and $\vec{v}_T$, using Equations (13) and (14).

FIG. 7 illustrates a top view of a cylinder tower with a mirror facet and camera according to some embodiments of the present disclosure. The tower edge 130 as seen as the reflected tower edge 135 in the image 110 is the location where the ray from the mirror 120 to the tower 125 is in line with the tangent vector of the cylindrical tower 125 surface. Tangent vectors as well as other reflection lines are shown to demonstrate different tower 125 points in the image 110.

With the known tower edge 125 position and the camera 105 position relative to the heliostat 115, the surface normal can then be calculated along the reflection line by following the methods described herein. The angular difference between the calculated surface normal and the design surface normal is treated as the slope error.

To solve for the slope error at a reflection point $X_R$, the corresponding tower point $X_T$ is needed. The tower point $X_T$ must lie on the line defined by the vector $\vec{v}_T=(v_x, v_y, v_z)$ and reference point $X_{T,0}=(x_{T,0}, y_{T,0}, z_{T,0})$ and must satisfy:

$$X_t = X_{T,0} + a\vec{v}_T \tag{23}$$

for an unknown parameter α. Substituting Equation (24) into Equation (3) defines the ray from the reflection point to the tower point as a function of parameter α;

$$\hat{rt}(\alpha) = \frac{X_{T,0} + \alpha\vec{v}_T - X_R}{\|X_{T,0} + \alpha\vec{v}_T - X_R\|} \tag{24}$$

Substituting $\hat{r}t(\alpha)$ into Equation ( ) and combining with Equation (1) gives the following overdetermined system of three equations with the two unknowns $(\theta_s, \alpha)$ which can be solved using a non-linear least squares solver:

$$\hat{r}t(\alpha) = \hat{c}r - 2(\mathcal{R}(\theta_s)\hat{n}_{ideal} \cdot \hat{c}r)\hat{n}_{real} \tag{25}$$

The rotation axis $\hat{r}$ used to define the rotation matrix given by Equation (2) will be defined to be the direction of the local reflected tower edge line tangent $\vec{w}$. The vector $\vec{w}$ can be calculated by deriving the ideal reflected edge line based on the known camera and tower edge positions, then calculating the tangent vector at a point on the edge nearest to the reflection point $X_R$. For the large focal lengths used in heliostat fields, the mirror facets may be very close to flat, in which case approximating the edge line tangent with a single constant vector will often be sufficient rather than recalculating the local tangent for each reflection point. The calculated slope error component will be in the direction of the vector perpendicular to the local reflected edge tangent:

$$\theta_s = sd_{\vec{w}}\perp \tag{26}$$

In this way, a slope error component $\theta_s$ can be solved for each reflection point $X_R$ along the reflected tower edges detected in each image. The one-dimensional optical error analysis is done because a point on the reflected tower edge 135 cannot be mapped to the corresponding point on the actual tower edge 130.

Figure 8:
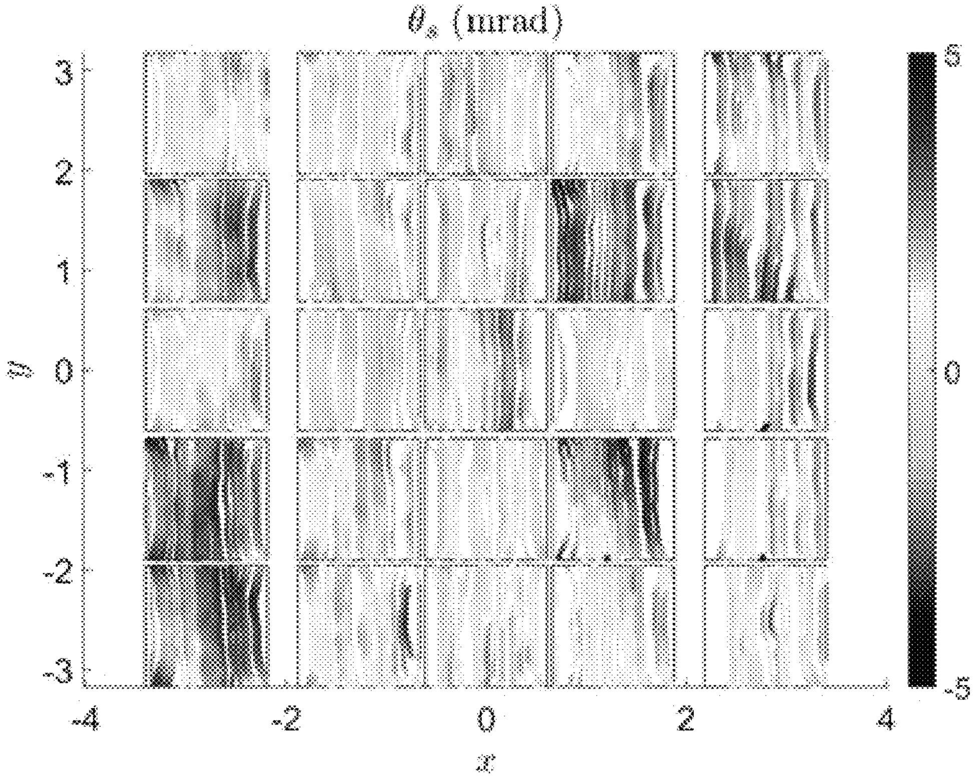
FIG. 8 illustrates the calculated slope error along the reflected tower edge lines for multiple images derived for 25 mirrors of a heliostat at NSTTF, according to some embodiments of the present disclosure.

By using a series of images 110 of the reflected tower edge 135 on a heliostat 115, the slope error for each reflected tower edge 135 point on each mirror 120 for the heliostat 115 can then be calculated and plotted, as shown in FIG. 8. Note that slope errors are mostly positive, which indicates an inaccurate tower-position assumption. FIG. 8 shows calculated mirror slope error derived from various reflection images for all 25 mirrors of a heliostat with ID 5W3 at the NSTTF, according to some embodiments of the present disclosure. For these results the reflected edge vector $\vec{w}$ is fixed at (0,1,0) because it was found that this produced calculated slope errors well within the needed accuracy from the values calculated when $\vec{w}$ is recalculated for each reflection point. The system of Equations (3), (5), (6), and (16) are solved with an iterative least-squares solver to calculate $\theta_s$ and $X_t$ for the reflection point $X_R$.

To solve for two-dimensional slope error, the slope error can be defined as the two dimensional quantity $(\theta_s^x, \theta_s^y)=(sd_x, sd_y)$ defined by the slope error components in the directions of the x and y axes. Slope error can be calculated using reflections of known reference points and/or using reflections of known reference lines in two distinct directions. When painting, markings, or structural marks are visible on the tower, point-to-point mapping of the reflected tower edge 135 to the actual tower edge 130 may be achieved. In some embodiments, the feature identified in the image 110 may be a painting or marking on the tower 125, rather than the reflected tower edge 135.

Using reflections of known reference points to determine slope error can be done when distinct known points on the tower 125 can serve as references of the heliostat 115 reflection in the image 110. For example, this can be done when reference points are painted on the tower 125.

With known camera ($X_C$), tower ($X_T$), and reflection ($X_R$) point positions, the local surface normal $\hat{n}_{real}$ can be calculated directly:

$$\hat{cr} = \frac{X_R - X_C}{\|X_R - X_C\|} \tag{28}$$

$$\hat{rt} = \frac{X_T - X_R}{\|X_T - X_R\|} \tag{29}$$

$$\hat{n}_{real} = \frac{\hat{rt} - \hat{cr}}{\|\hat{rt} - \hat{cr}\|} \tag{30}$$

Figure 9:
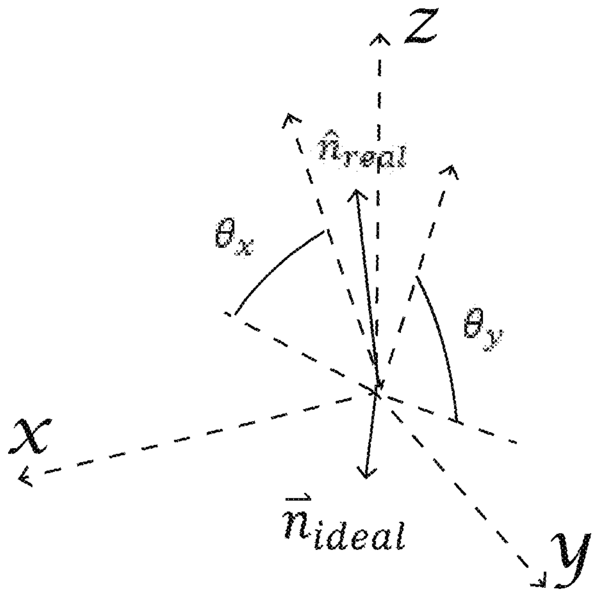
FIG. 9 illustrates a coordinate system to determine slope error in two dimensions, according to some embodiments of the present disclosure.

By defining the coordinate system to the axes of the heliostat, the 2D slope error ($\theta_s^x$, $\theta_s^y$) can be calculated by projecting $\hat{n}_{real}$ and the ideal surface normal $\hat{n}_{ideal}$ into the xz and yz planes, respectively and determining the rotation angles as shown in FIG. 9. FIG. 9 illustrates a coordinate system to determine slope error in two dimensions, according to some embodiments of the present disclosure. In FIG. 9, the ideal ($\hat{n}_{ideal}$) and real ($\hat{n}_{real}$) surface normal are projected into the xz and yz planes to calculated the 2D slope error ($\theta_s^x$, $\theta_s^y$).

Define $proj_{xz}\hat{n}_{real}$ and $proj_{yz}\hat{n}_{real}$ as the projections of $\hat{n}_{real}$ into the xz and yz planes respectively:

$$proj_{xz}\hat{n}_{real} = \hat{n}_{real} - \left(\begin{bmatrix}0\\1\\0\end{bmatrix} \cdot \hat{n}_{real}\right)\begin{bmatrix}0\\1\\0\end{bmatrix} = \begin{bmatrix}\hat{n}_{real}^x\\0\\\hat{n}_{real}^z\end{bmatrix} \tag{31}$$

$$proj_{yz}\hat{n}_{real} = \hat{n}_{real} - \left(\begin{bmatrix}1\\0\\0\end{bmatrix} . \hat{n}_{real}\right)\begin{bmatrix}1\\0\\0\end{bmatrix} = \begin{bmatrix}0\\\hat{n}_{real}^y\\\hat{n}_{real}^z\end{bmatrix} \tag{32}$$

The projections of $\hat{n}_{ideal}$ into the xz and yz planes are calculated similarly, and the slope error components are the rotation angles between the now 2D normal vectors:

$$\begin{bmatrix}\hat{n}_{real}^x\\\hat{n}_{real}^z\end{bmatrix} = R(\theta_s^x)\begin{bmatrix}\hat{n}_{ideal}^x\\\hat{n}_{ideal}^z\end{bmatrix} \tag{33}$$

$$\begin{bmatrix}\hat{n}_{real}^y\\\hat{n}_{real}^z\end{bmatrix} = R(\theta_s^y)\begin{bmatrix}\hat{n}_{ideal}^y\\\hat{n}_{ideal}^z\end{bmatrix} \tag{34}$$

$$R(\theta) = \begin{bmatrix}\cos\theta & -\sin\theta\\\sin\theta & \cos\theta\end{bmatrix} \tag{35}$$

After simplifying the above equations, the slope error components can be calculated directly:

$$\theta_s^x = a\sin\left[\frac{\hat{n}_{real}^x\hat{n}_{ideal}^z + \hat{n}_{real}^z\hat{n}_{ideal}^x}{(\hat{n}_{ideal}^x)^2 + (\hat{n}_{ideal}^z)^2}\right] \tag{36}$$

-continued $$\theta_s^y = a\sin\left[\frac{\hat{n}_{real}^y\hat{n}_{ideal}^z + \hat{n}_{real}^y\hat{n}_{ideal}^x}{(\hat{n}_{ideal}^y)^2 + (\hat{n}_{ideal}^z)^2}\right] \tag{37}$$

Figure 10A:
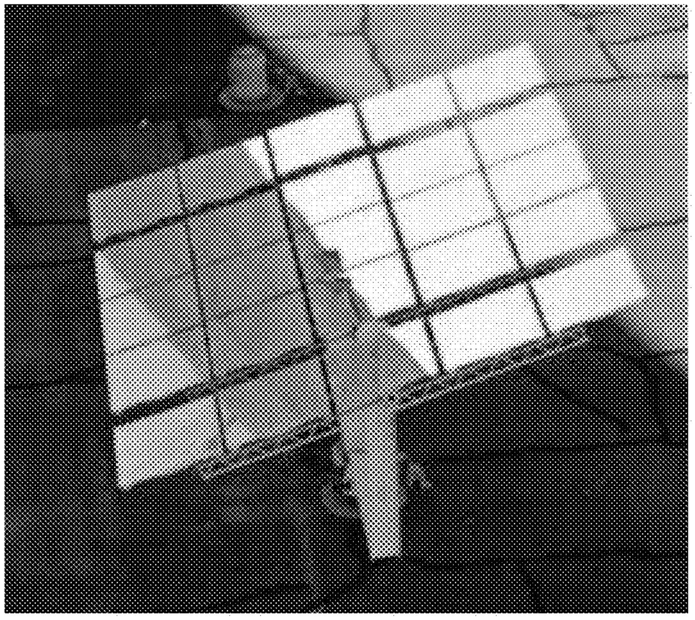
FIG. 10A illustrates an image collected of a first orientation of a heliostat at NSTTF with a first reflected tower edge direction. according to some embodiments of the present disclosure.
Figure 10B:
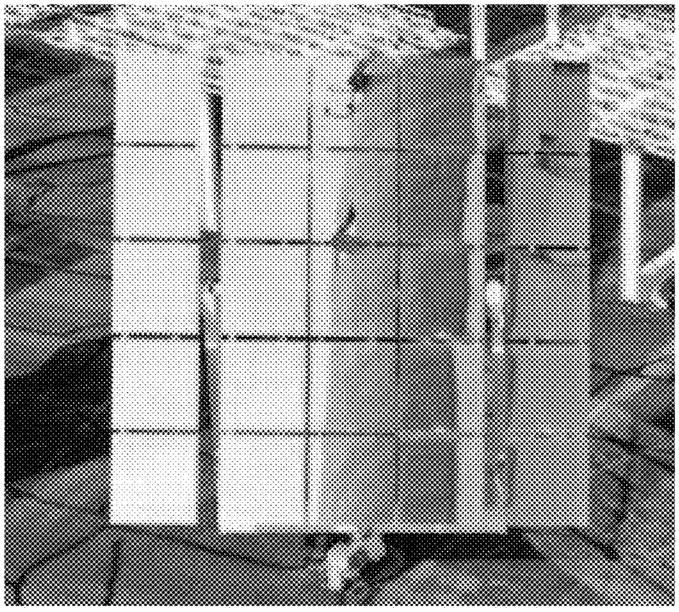
FIG. 10B illustrates an image collected of a second orientation of the same heliostat at NSTFF with a second reflected tower edge direction, according to some embodiments of the present disclosure.

When exact tower 125 points are not known, the 2D slope error can be calculated by using reflections of the tower edge 130 line in two distinct directions. For this case, it is assumed that the exact position of the tower edge 130 is known, but individual points along the tower edge 130 cannot be differentiated in the reflection. Different reflected tower edge 135 directions are achieved by adjusting the orientation of the heliostat 115, as shown by images of two different orientations of a NSTTF heliostat in FIGS. 10A-B. FIG. 10A illustrates an image 110 collected of a heliostat 115 at NSTTF with a first reflected tower edge 135 direction, according to some embodiments of the present disclosure. FIG. 10B illustrates an image collected of a second orientation of the same heliostat 115 at NSTTF with a second reflected tower edge 135 direction, according to some embodiments of the present disclosure. Images 110 can be taken at multiple different heliostat 115 orientations to provide optical error measurement in the two-dimensional domain. At a given set of elevation and azimuth angles, the reflected tower edge 135 may form a different angle with respect to the heliostat 115 edges, and it may provide optical erroring the direction perpendicular to the reflected tower edge 135 on the heliostat 115 surface. At a given surface point, two reflected tower edges 135 at two different angles to the reference heliostat 115 edge will give rise to a two-dimensional surface normal deviation from a design plane. When the two reflected tower edge 135 lines are not perpendicular to each other, an additional coordinate transformation process can be added to calculate optical errors at two orthogonal directions at a local surface around the surface point of interest.

Figure 11:
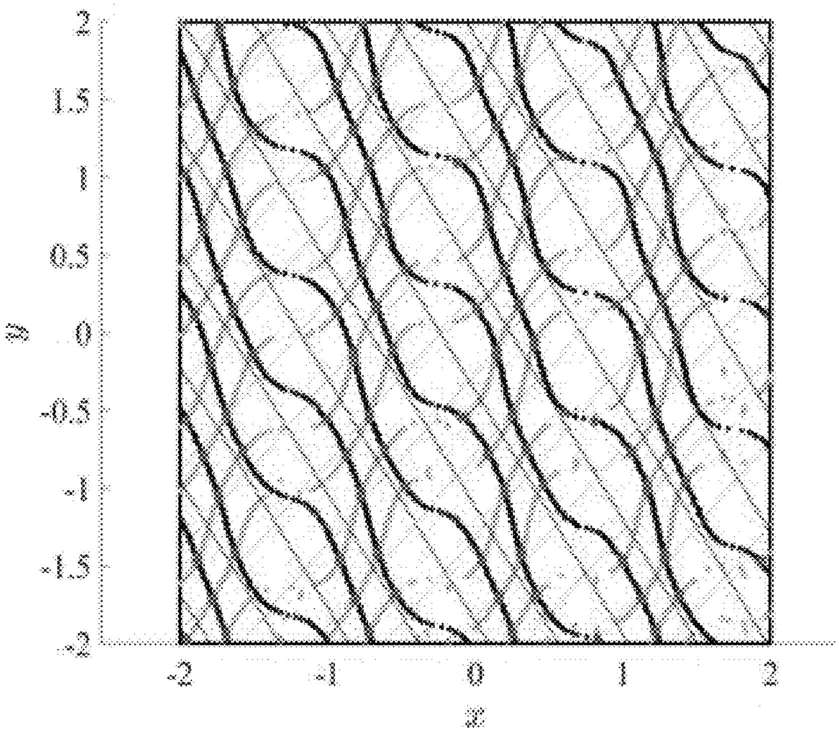
FIG. 11 illustrates a mirror with overlaid reflected tower edge points as seen from multiple camera positions for two different heliostat orientations, according to some embodiments of the present disclosure.

FIG. 11 illustrates a mirror with overlaid reflected tower edge 135 points as seen from multiple camera 105 positions for two different heliostat 115 orientations, according to some embodiments of the present disclosure. FIG. 11 shows a simulated 4×4 m mirror 120 with a series of reflected edges for varying camera positions for two different mirror 120 orientations relative to the tower 125. For this test case, the mirror facet is located directly 500 m north of the tower with a camera capturing images 50 m from the mirror facet. For the first orientation (lines going top left to lower right) the mirror facet has azimuth 130° and elevation 45°, pointing east of the tower, and for the second orientation (lines going top right to lower left)) the mirror has azimuth 220° and elevation 45°, pointing west of the tower. Canting error and slope error have been introduced into the mirror by rotating the ideal mirror position about the x and y axes by 2 and 3 mrad respectively, and by introducing a sine wave term to warp the shape. The thick points are the true reflection points, and the thin lines are the ideal reflection edges.

At the intersection points of the reflected edges for both sets of data, information is known about the slope error in two distinct directions, and the local normal vector and slope error components can be derived. Assuming images are collected at i=1,2 different mirror 120 orientations, we consider a reflection point $X_R$ which is one of the intersection points shown in FIG. 11. For each orientation, there exists a known camera 105 position $X_C^i$ known camera 105 to reflection point ray $\hat{cr}^i$:

$$\widehat{cr}^{i} = \frac{X_R - X_C^i}{\|X_R - X_C^i\|} \tag{38}$$

and known tower edge position defined by $X_{T,0}^{\ i}$ a reference point along the tower edge, and $v_T^{\ i}$ a vector in the direction of the tower edge line. FIG. 11 illustrates a mirror 120 with overlaid reflected tower edge 135 points as seen from multiple camera 105 positions for orientation 130° azimuth and 45° elevation and orientation 220° azimuth and 45° elevation. The mirror 120 is located 500 m north of the tower 125 with camera 105 50 m away. Canting has been introduced by rotating the mirror 120 by 2 and 3 mrad about the x and y axes respectively, and slope error has been introduced by introducing a sine wave term into the mirror 120 shape equation. Thick points indicate the true reflection points, and the thin blue and green lines indicate the ideal reflection points. The unknown local normal surface normal $\hat{n}_{real}$ can be expressed in terms of the slope error components $(\theta_s^{\ x}, \theta_s^{\ y})$ and the ideal surface normal $\hat{n}_{ideal}$ by rearranging equations defined in the derivation of method 1:

$$\hat{n}_{real}(\theta_s^x, \theta_s^y) = \begin{bmatrix} \hat{n}_{ideal}^x \cos\theta_s^x - \hat{n}_{ideal}^z \sin\theta_s^x \\ \hat{n}_{ideal}^y \cos\theta_s^y - \hat{n}_{ideal}^z \sin\theta_s^y \\ \hat{n}_{ideal}^x \sin\theta_s^x + \hat{n}_{ideal}^Z \cos\theta_s^x \end{bmatrix} \tag{39}$$

Applying the law of reflections gives the reflection point to tower point ray as a function of $(\theta_s^{\ x}, \theta_s^{\ y})$:

$$\hat{rt}^{i}(\theta_s^{\ x},\theta_s^{\ y}) = \hat{cr}^{i} - 2[\hat{n}_{real}(\theta_s^{\ x},\theta_s^{\ y})\cdot\hat{cr}^{i}]\hat{n}_{real}(\theta_s^{\ x},\theta_s^{\ y}) \tag{40}$$

The tower ray line defined by the point vector pair $(X_R, \hat{r}t^i)$ must intersect the tower line defined by $(X_{T,0}^{\ i}, v_T^{\ i})$. Requiring that the distance between these two lines is zero gives the equation:

$$0 = \frac{|(X_R - X_{T,0}^i)\cdot(\hat{rt}^i(\theta_s^x, \theta_s^y) \times v_T^i)|}{\|\hat{rt}^i(\theta_s^x, \theta_s^y) \times v_{t,i}\|} \tag{41}$$

Applying data from both mirror orientations, i=1,2 yields two equations with two unknowns $(\theta_s^{\ x}, \theta_s^{\ y})$. The system cannot be solved directly but can be solved numerically using an iterative nonlinear least squares solver.

The canting error $(\theta_c)$ of a mirror 120 is calculated by averaging all the slope errors for the mirror 120 based on the process described herein. As illustrated in FIGS. 12 A-B, the canting error was calculated for each individual mirror 120 for the heliostat 115 of interest-5W3 at NSTTF. Specific canting errors are also given in Table 3. Most of the mirrors 120 tested had a positive canting error.

Figure 12A:
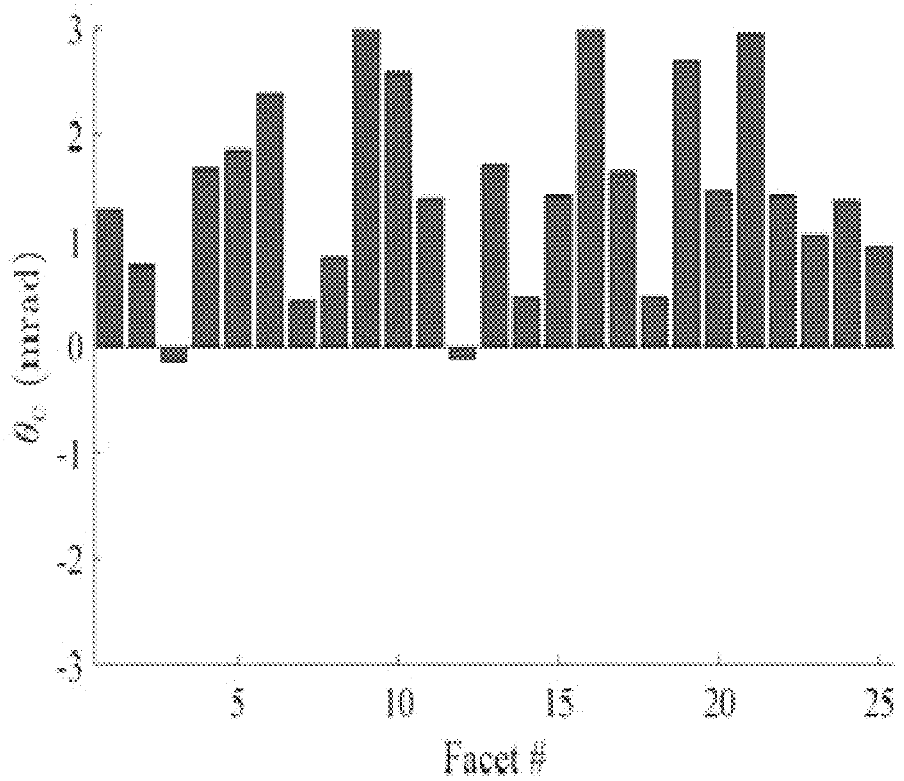
FIG. 12A illustrates the canting error for all 25 mirrors of heliostat 5W3 at the NSTTF calculated from slope errors, according to some embodiments of the present disclosure.
Figure 12B:
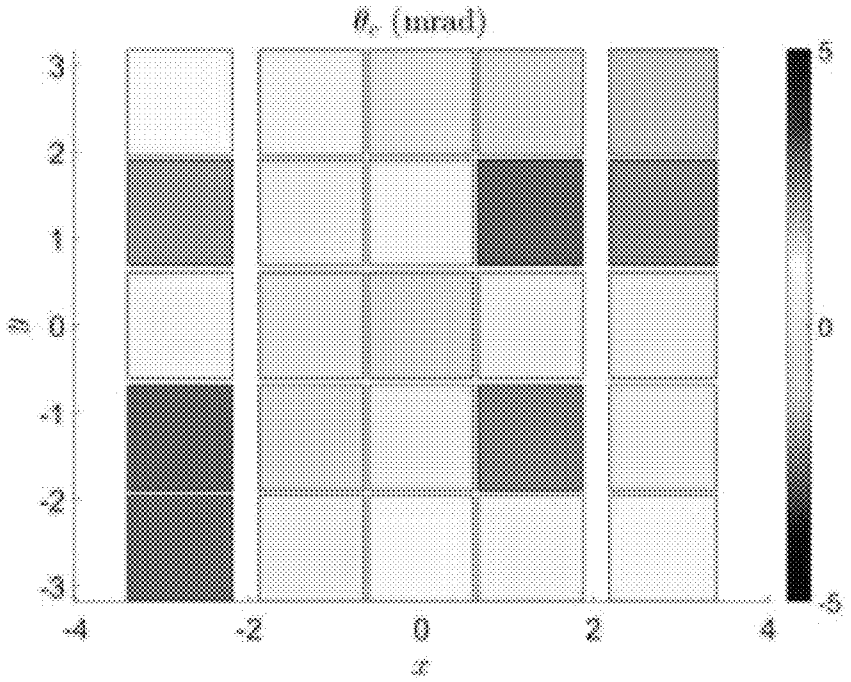
FIG. 12B illustrates the canting error for all 25 mirrors of heliostat 5W3 at the NSTTF calculated from slope errors according to some embodiments of the present disclosure in a greyscale overlaid on the mirrors.

If all mirrors 120 are re-canted (i.e., adjusted or re-oriented) with the calculated canting error, then the whole heliostat 115 would be rotated toward a direction that effectively is equivalent to the tracking (or pointing) error of the whole heliostat 115. Using the central mirror 120 (No. 13 in this example) as the reference facet, the heliostat 115 tracking error is then the canting error of the reference facet: 1.71 mrad. FIG. 12A shows canting error $\theta_c$ for each mirror 120 of heliostat 115 5W3 calculated from slope error results with a bar plot, according to some embodiments of the present disclosure. FIG. 12B shows a color scale overlaid on the 25 mirrors 120, according to some embodiments of the present disclosure.

TABLE 3

Estimated canting error in milliradians for mirrors analyzed with the Distant Observer method. The central mirror is marked as the reference facet (REF).

| Mirror Facet Row/Column | 1 | 2 | 3 | 4 | 5 |
|---|---|---|---|---|---|
| 1 | 1.29 | 0.76 | −0.15 | 1.67 | 1.86 |
| 2 | 2.38 | 0.44 | 0.84 | 3.12 | 2.58 |
| 3 | 1.40 | −0.12 | 1.71 (REF) | 0.47 | 1.42 |
| 4 | 3.09 | 1.65 | 0.47 | 2.70 | 1.46 |
| 5 | 2.96 | 1.42 | 1.04 | 1.39 | 0.95 |

The existence of the heliostat tracking error indicates the inaccuracy of the heliostat 115 orientation in the heliostat-field control system. In the NIO system, the reference coordinate system is attached to the heliostat for the sake of mathematical simplicity. The camera 105 position and the tower 125 position are relative to the heliostat. Thus, the calculation of the heliostat 115 tracking error can be used to correct the relative position of the tower 125.

Figure 13:
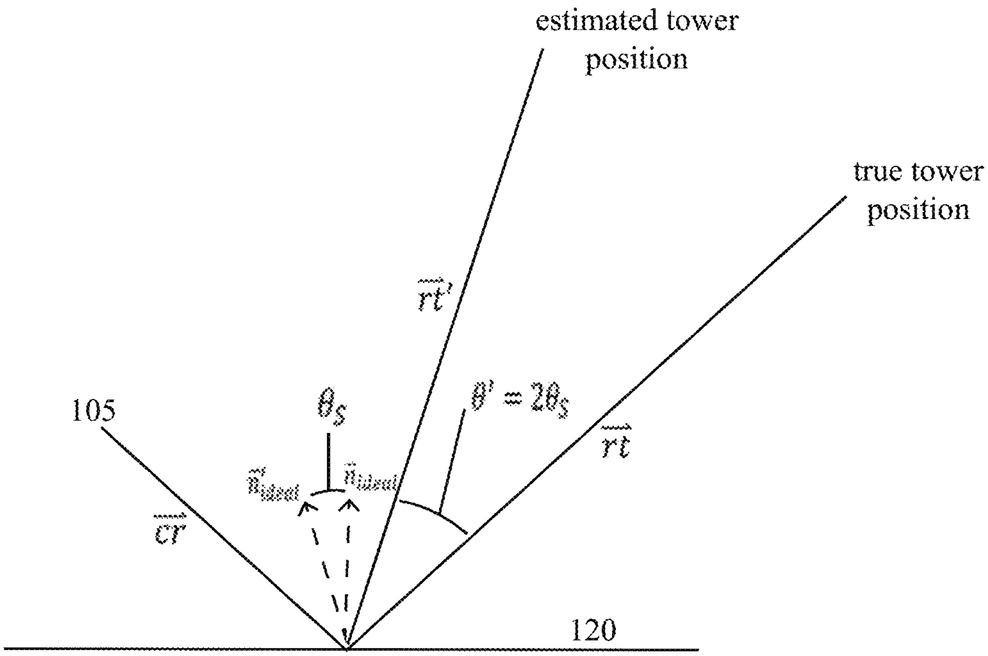
FIG. 13 illustrates a coordinate system for determining tower position based on slope error, according to some embodiments of the present disclosure.

FIG. 13 illustrates a coordinate system for determining tower 125 position based on slope error, according to some embodiments of the present disclosure. As shown in FIG. 13, an assumed tower 125 correction may be corrected from slope error measurement. FIG. 13 illustrates how to correct the tower 125 position using the heliostat tracking error. Assuming a perfectly flat mirror, a surface normal can then be calculated for an initially estimated tower position and the true tower position. The angular difference between the two tower vectors is twice that between two surface normal vectors. When the tower distance is long relatively to the mirror facet dimension, the tower angular correction angle θ' is nearly constant for the whole mirror facet surface.

Figure 14A:
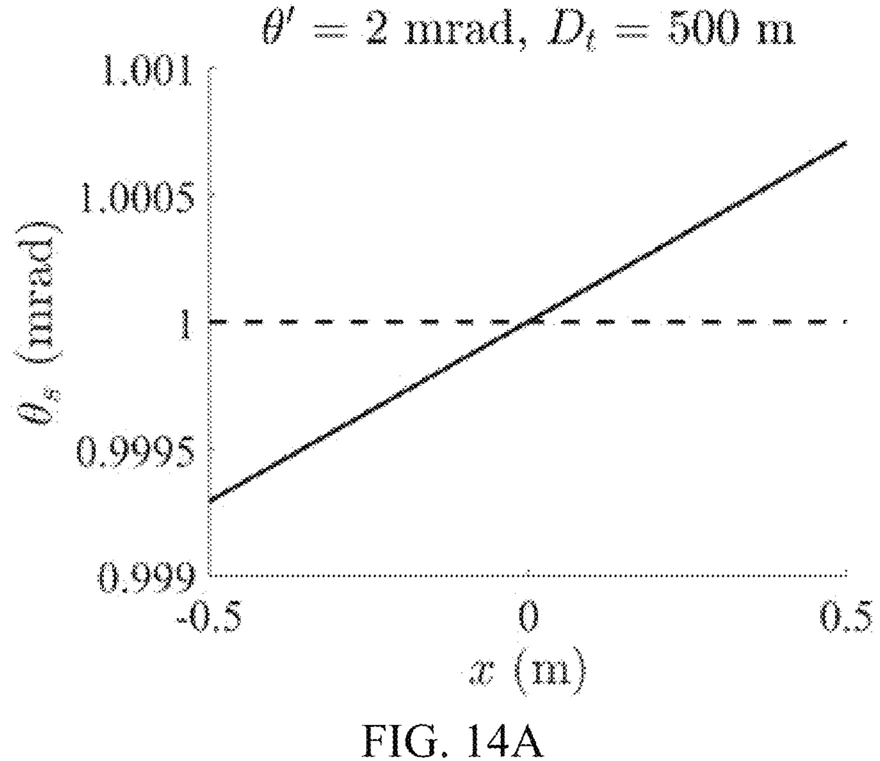
FIG. 14A illustrates slope error calculated along the length of a mirror, according to some embodiments of the present disclosure.
Figure 14B:
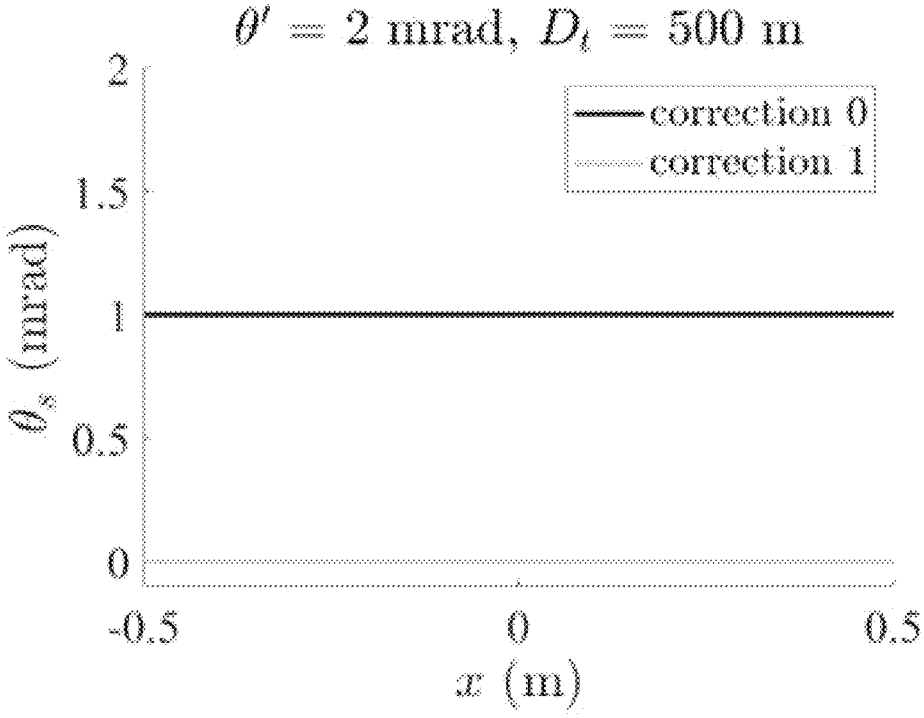
FIG. 14B shows how the calculated slope error along the mirror changes after the first target angular position correction.

FIGS. 14A-B show the impact of tower 125 position error and its iterative correction to the slope error. Here, a two-dimensional case study is given by assuming that a mirror 120 is a line, as shown in FIG. 13. In this case, the mirror 120 width is 1.0 m wide and is perfectly flat. The tower is placed 500 m away, and the tower's angular position error θ' is set to be 2 mrad with respect to the center for the mirror facet. With the intentionally misplaced target (i.e., the tower 125), the calculated slope error is plotted along the mirror 120 dimension in FIG. 14A. At the mirror 120 center, the calculated slope error is 1 mrad, which is half of the misplaced target deviation angle. The calculated slope error varies with the mirror 120 surface position. The average of the calculated slope error over the entire mirror 120 surface is then close to 1 mrad, marked by the dashed line. Note that the mirror 120 surface is assumed to be perfectly flat, and the fact that the calculated slope error is non-zero is because of the misplaced target (tower) angular position.

The average of the calculated slope error is then used to correct the angular position of the tower, which is the misplaced target. The calculated slope error along the entire mirror changes after the first target angular position correction, as shown in FIG. 14B. The average of the calculated slope error is reduced to close to 0 mrad after the first correction. This proves that the target position correction can greatly improve the slope error calculation and capture the mirror tracking error. FIG. 14A shows the impacts of target (tower) position θ' and FIG. 14B shows its iterative correction to the surface slope error.

Figure 15:
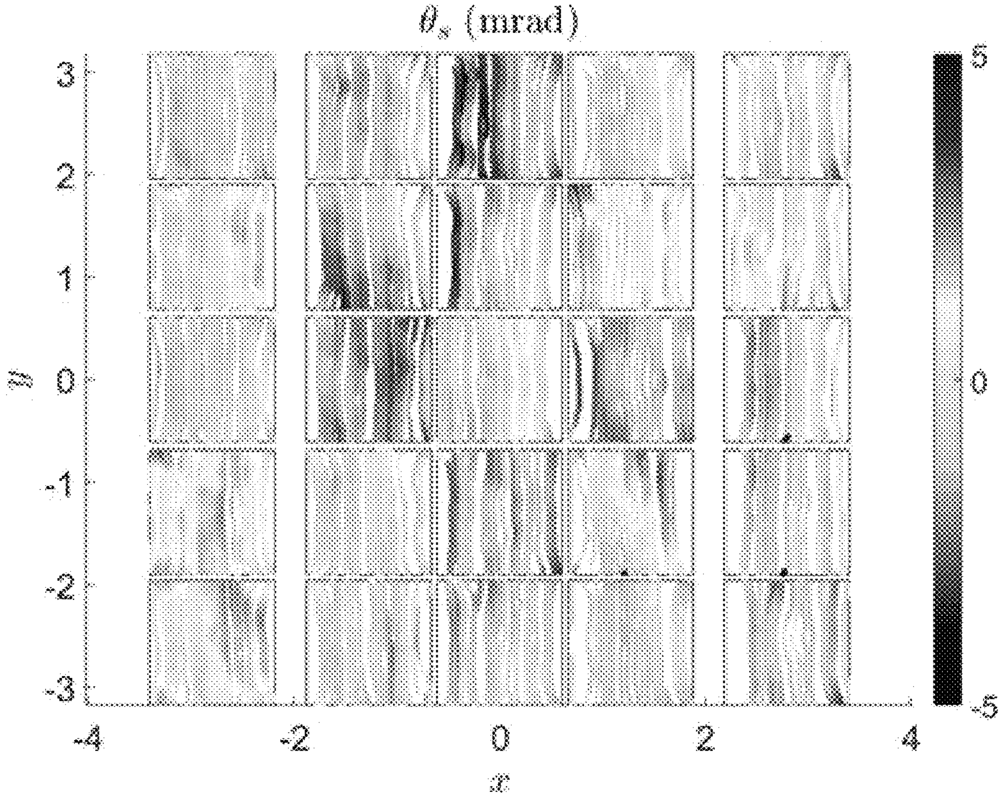
FIG. 15 illustrates the slope error recalculated for all 25 mirrors of heliostat 5W3 at the NSTTF, according to some embodiments of the present disclosure.
Figure 16A:
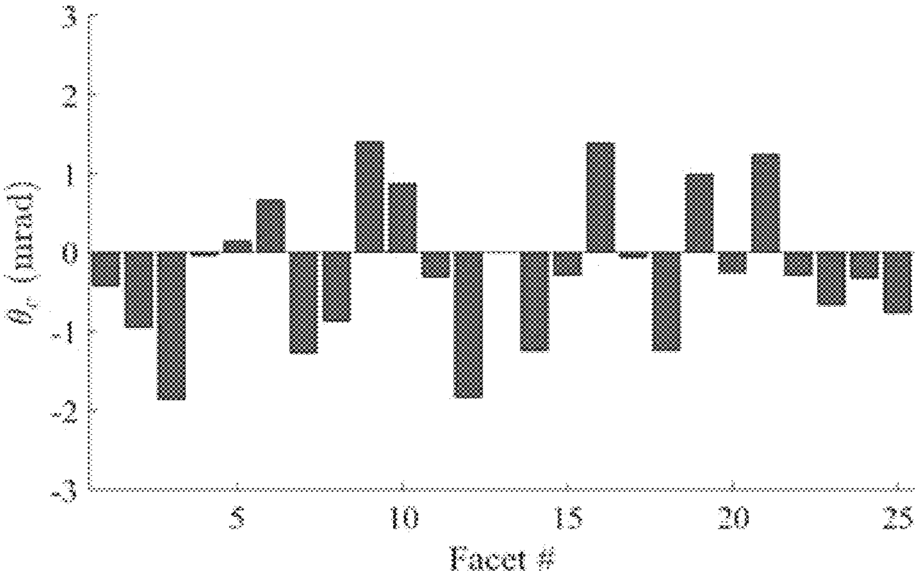
FIG. 16A illustrates the new canting error for all 25 mirrors of heliostat 5W3 at the NSTTF recalculated from the new slope errors, according to some embodiments of the present disclosure.
Figure 16B:
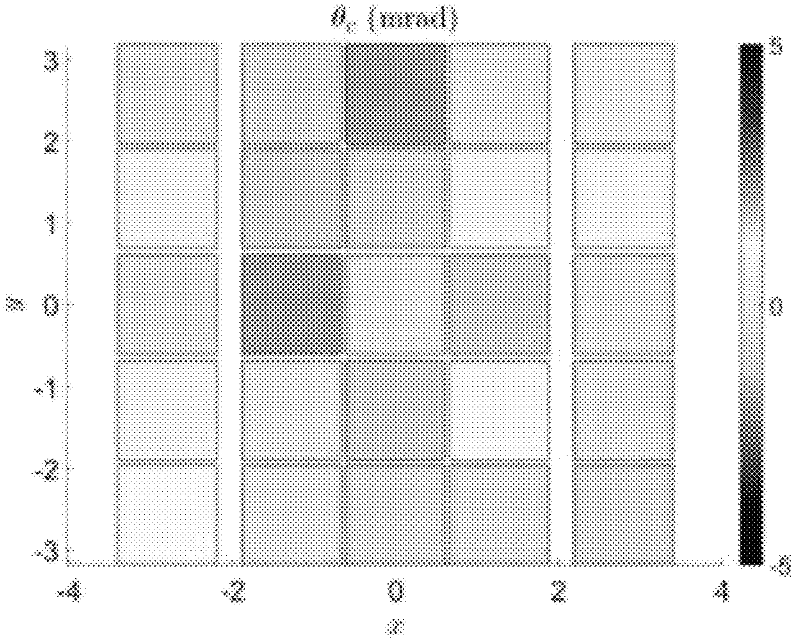
FIG. 16B illustrates the new canting error for all 25 mirrors of heliostat 5W3 at the NSTTF recalculated from the new slope errors according to some embodiments of the present disclosure in a greyscale overlaid on the mirrors.

The target (tower) angular position correction scheme can be extended to three dimensions and applied to the test case of the heliostat 5W3. The calculated heliostat 115 tracking error of 1.33 mrad is first used to correct the tower angular position. With the corrected tower angular position relative to the heliostat of interest, the mirror surface slope error and the canting error can then be recalculated, as shown in FIG. 15 and FIGS. 16A-B. Note that the canting error of the reference mirror facet No. 13 is calculated to be zero mrad after the tower angular position correction. Depending on the specific circumstance, a different mirror facet or any mirror plane can be used as the reference plane for tracking error and canting error calculation.

FIG. 15 shows the slope error $\theta_s$ distribution over the surface of the heliostat 5W3 after the tower angular position correction scheme is applied. FIG. 16 shows the canting error for each mirror of 5W3 calculated from slope error results shown in FIG. 8 with a bar plot (FIG. 16A) and a color scale overlaid on the 25 mirrors (FIG. 16B), after the tower angular position correction scheme is applied.

Measurement uncertainty of optical error using the NIO approach is also performed based on the calculated results on heliostat 5W3. Uncertainty analysis was performed on the following quantities: 1) Heliostat tracking error, 2) Root mean square (RMS) of slope error over the entire heliostat, 3) Canting error of individual mirror, 4) RMS of slope error over individual mirror.

Figure 17:
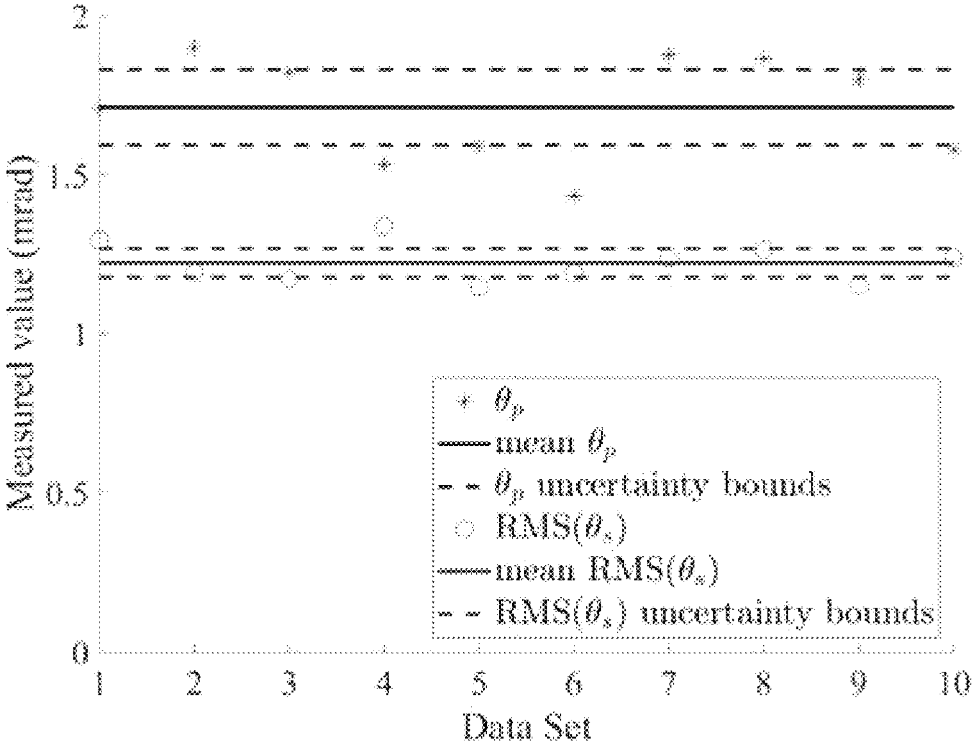
FIG. 17 illustrates the calculated tracking error and root mean squared (RMS) slope error for 10 data sets with error bars, according to some embodiments of the present disclosure.

A total of 10 sets of images were used to assess optical errors of the heliostat 5W3. Each set of images includes about 40 reflection images with the tower reflection sweeping from one side to the other side. Ten sets of images give rise to 10 independent measurements of optical errors on the same heliostat. The measurement uncertainty range corresponding to a confidence level of 95% can then be calculated by using a straightforward Student's t method. FIG. 17 gives the calculated tracking error and the heliostat slope error RMS and their uncertainty band with a confidence level of 95%.

Table 4 shows the uncertainty analysis results for the tracking error and RMS of slope error. The average of 10 measurements for tracking error and slope error RMS are 1.71 mrad and 1.22 mrad, respectively. The corresponding uncertainty at a confidence level of 95% is then 0.12 mrad for heliostat tracking error and 0.05 mrad for heliostat slope error RMS.

TABLE 4

Uncertainty analysis of heliostat tracking error and heliostat RMS of slope error for the 10 datasets of 5W3.

| | Average Measured Value (mrad) | Expanded Uncertainty (mrad) |
|---|---|---|
| Heliostat tracking error | 1.71 | 0.12 |
| Heliostat slope error RMS | 1.22 | 0.05 |

Figure 18:
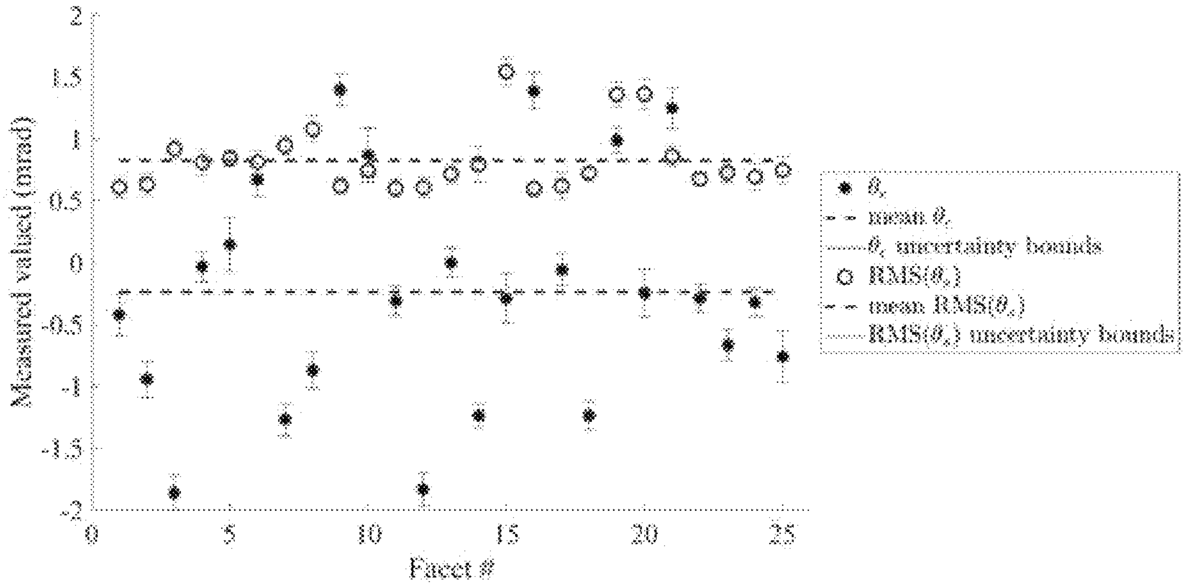
FIG. 18 illustrates the measurement uncertainty analysis results for the individual mirror canting and slope error RMS, respectively, according to some embodiments of the present disclosure.

Table 5 and Table 6 show the measurement uncertainty analysis results for the individual mirror canting error and slope error RMS, respectively. The average canting error of an individual mirror varies from −1.86 mrad to 1.38 mrad, and their expanded uncertainty at a confidence level of 95% is lower than or equal to 0.22 mrad. FIG. 18 shows the calculated tracking errors and RMS slope errors for each image set with error bars to show the uncertainty.

FIG. 18 shows the calculated tracking error and RMS slope error for the 10 data sets with error bars. Tracking error has a mean of 1.71 mrad and uncertainty of 0.12 mrad at a confidence level of 95%. RMS slope error has a mean of 1.22 mrad and uncertainty of 0.05 mrad at a confidence level of 95%.

TABLE 5

Uncertainty analysis of mirror canting error based on the 10 datasets of 5W3. Mirrors are numbered column-wise.

| Mirror No. | Average Measured Canting Error (mrad) | Expanded Uncertainty of Canting Error (mrad) |
|---|---|---|
| 1 | −0.42 | 0.17 |
| 2 | 0.67 | 0.14 |
| 3 | −0.31 | 0.12 |
| 4 | 1.38 | 0.15 |
| 5 | 1.25 | 0.16 |
| 6 | −0.95 | 0.15 |
| 7 | −1.27 | 0.13 |
| 8 | −1.83 | 0.13 |
| 9 | −0.06 | 0.13 |
| 10 | −0.29 | 0.11 |
| 11 | −1.86 | 0.14 |
| 12 | −0.87 | 0.15 |
| 13 | 0.00 | 0.12 |
| 14 | −1.24 | 0.12 |
| 15 | −0.66 | 0.13 |
| 16 | −0.04 | 0.12 |
| 17 | 1.4 | 0.13 |
| 18 | −1.24 | 0.10 |
| 19 | 0.99 | 0.11 |
| 20 | −0.32 | 0.11 |
| 21 | 0.15 | 0.22 |
| 22 | 0.87 | 0.22 |
| 23 | −0.29 | 0.20 |
| 24 | −0.25 | 0.20 |
| 25 | −0.76 | 0.21 |

TABLE 6

Uncertainty analysis of mirror slope error RMS based on the 10 datasets of 5W3. Mirrors are numbered column-wise.

| Mirror No. | Average Measured Slope Error RMS (mrad) | Expanded Uncertainty of Slope Error RMS (mrad) |
|---|---|---|
| 1 | 0.61 | 0.09 |
| 2 | 0.81 | 0.09 |
| 3 | 0.60 | 0.07 |
| 4 | 0.60 | 0.06 |
| 5 | 0.86 | 0.08 |
| 6 | 0.63 | 0.09 |
| 7 | 0.94 | 0.08 |
| 8 | 0.61 | 0.08 |
| 9 | 0.62 | 0.11 |
| 10 | 0.67 | 0.06 |
| 11 | 0.92 | 0.08 |
| 12 | 1.08 | 0.11 |
| 13 | 0.71 | 0.08 |
| 14 | 0.72 | 0.04 |
| 15 | 0.73 | 0.08 |
| 16 | 0.81 | 0.11 |
| 17 | 0.62 | 0.06 |
| 18 | 0.79 | 0.14 |
| 19 | 1.36 | 0.10 |
| 20 | 0.69 | 0.11 |
| 21 | 0.84 | 0.06 |
| 22 | 0.74 | 0.06 |
| 23 | 1.54 | 0.11 |
| 24 | 1.36 | 0.12 |
| 25 | 0.74 | 0.10 |

FIG. 18 illustrates the measurement uncertainty analysis results for the individual mirror canting and slope error RMS, respectively. The average canting error of individual mirror varies from −1.86 mrad to 1.38 mrad, and their expanded uncertainty at a confidence level of 95% is lower than or equal to 0.22 mrad.

The present disclosure demonstrates the optical error measurement on heliostats in one dimension using NIO. It is because a point on the reflection line of the tower edge cannot be mapped to the corresponding point on the actual tower edge. Multiple solutions enable the MO approach to measure optical error in two dimensions: 1) An additional painting on the tower surface or additional structural marks would allow point-to-point mapping between the reflection images and the actual target (tower). If a point-to-point mapping is achieved, the NIO approach can measure optical error of heliostats in two dimensions. 2) If no changes can be made to the target (tower), then reflection images on a heliostat can be taken at multiple different heliostat orientations to provide optical error measurement in the two-dimensional domain. At a given set of elevation and azimuth angles, the reflection line will form a different angle with respect to the heliostat edges, and it will provide optical error in the direction perpendicular to the reflection line on the heliostat surface. At a given surface point, two reflection lines at two different angles to a reference heliostat edge will give rise to a two-dimensional surface normal deviation from a design shape. When the two reflection lines are not perpendicular to each other, an additional linear regulation process can be added to calculate optical errors at two orthogonal directions at a local surface The present disclosure includes a NIO approach to perform efficient measurements of optical errors on heliostats 115 in a solar power-tower plant. It is demonstrated that the NIO approach described herein can measure slope error, canting error, and tracking error based on images taken in-situ at a large-scale test heliostat field. In particular, the NIO approach described herein corrects the relative position of the tower 125 and to derive the tracking error. The measurement uncertainty of optical errors using MO as described herein is less than 0.2 mrad. The NIO approach described herein provides the first-of-the-kind in-situ measurement of slope error applicable to a utility-scale heliostat field using the natural structural objects in a solar power-tower plant. By measuring slope error over the entire heliostat surface, the canting error and tracking error can then be readily derived and used to improve the performance of heliostats by performing re-canting and tracking-correction at the field.

Disclosed herein is how to solve the two-dimensional problem of locating the tower 125 based on a camera 105 position and mirror 120 position. Consider a tower 125 position $X_t$, a camera 105 position $X_c$, and the corresponding reflection point position $X_r$. Define the vectors ĉr and r̂t to be the unit vectors in the directions of the rays from the camera 105 to the reflected point and from the reflected point to the tower point respectively:

$$\hat{cr} = \frac{X_r - X_c}{D_c}, \hat{rt} = \frac{X_t - X_r}{D_t} \tag{42}$$

where $D_c$ and $D_t$ are the distances of the camera 105 and tower 125 from the mirror 120, respectively. The coordinate system was defined such that the reflected point position is centered at the origin and the ideal surface normal of the mirror 120 $\hat{n}_{ideal}$ points in the direction of the positive y-axis. Define $\theta_{tower}$ to be the angle of the tower 125 relative to the mirror 120. The vectors ĉt and r̂t satisfy the law of reflection with $\hat{n}_{ideal}$ so that:

$$\hat{n}_{ideal} = \begin{bmatrix} 0 \\ 1 \end{bmatrix} \tag{43}$$

$$\hat{rt} = \hat{cr} - 2(\hat{n}_{ideal} \cdot \hat{cr})\hat{n}_{ideal} \tag{44}$$

$$\hat{rt} = \begin{bmatrix} \cos\theta_{tower} \\ \sin\theta_{tower} \end{bmatrix}, \hat{cr} = \begin{bmatrix} \cos\theta_{tower} \\ -\sin\theta_{tower} \end{bmatrix} \tag{45}$$

Consider a guess for the tower 125 position $X'_t$ which is offset by an angle of θ' from the true tower 125 position $X_t$ such that $$X_t = D_t \begin{bmatrix} \cos\theta_{tower} \\ \sin\theta_{tower} \end{bmatrix}, \quad X'_t = D_t \begin{bmatrix} \cos(\theta_{tower} + \theta') \\ \sin(\theta_{tower} + \theta') \end{bmatrix}, \quad \hat{rt}' = \begin{bmatrix} \cos(\theta_{tower} + \theta') \\ \sin(\theta_{tower} + \theta') \end{bmatrix} \tag{46}$$

Applying the law of reflection with $X'_t$ creates the offset surface normal $\hat{n}'_{ideal}$. The tracking error $\theta_{track}$ is defined by the angle between $\hat{n}_{ideal}$ and $\hat{n}'_{ideal}$. This causes $\hat{n}'_{ideal}$ to become $$\hat{n}_{ideal}' = \begin{bmatrix} \cos\theta_{track} & -\sin\theta_{track} \\ \sin\theta_{track} & \cos\theta_{track} \end{bmatrix} \begin{bmatrix} 0 \\ 1 \end{bmatrix} = \begin{bmatrix} -\sin\theta_{track} \\ \cos\theta_{track} \end{bmatrix} \tag{47}$$

Applying the law of reflection gives:

$$\hat{rt}' = \hat{cr} - 2(\hat{n}'_{ideal} \cdot \hat{cr})\hat{n}'_{ideal} \tag{48}$$

$$\begin{bmatrix} \cos(\theta_{tower} + \theta') \\ \sin(\theta_{tower} + \theta') \end{bmatrix} = \begin{bmatrix} \cos\theta_{tower} \\ -\sin\theta_{tower} \end{bmatrix} - 2\left(\begin{bmatrix} -\sin\theta_{track} \\ \cos\theta_{track} \end{bmatrix} \cdot \begin{bmatrix} \cos\theta_{tower} \\ -\sin\theta_{tower} \end{bmatrix}\right)\begin{bmatrix} -\sin\theta_{track} \\ \cos\theta_{track} \end{bmatrix} \tag{49}$$

$$\begin{bmatrix} \cos(\theta_{tower} + \theta') \\ \sin(\theta_{tower} + \theta') \end{bmatrix} = \begin{bmatrix} \cos\theta_{tower}\cos(2\theta_{track}) - \sin\theta_{tower}\sin(2\theta_{track}) \\ \sin\theta_{tower}\cos(2\theta_{track}) + \cos\theta_{tower}\sin(2\theta_{track}) \end{bmatrix} \tag{50}$$

$$\begin{bmatrix} \cos(\theta_{tower} + \theta') \\ \sin(\theta_{tower} + \theta') \end{bmatrix} = \begin{bmatrix} \cos(\theta_{tower} + 2\theta_{track}) \\ \sin(\theta_{tower} + 2\theta_{track}) \end{bmatrix} \tag{51}$$

$$\theta' = 2\theta_{track} \tag{52}$$

Therefore, the angle offset of the tower 125 is twice the tracking error at the reflected point.

The relationship between the tower 125 orientation offset and tracking angles of the mirror 120 can be used to calculate the tower 125 position using an initial estimate. The mean slope error $\mu(\theta_s)$ of the mirror surface should approach zero as the number of images N of the reflected point increases. If the mean slope error is nonzero, that indicates uncertainty in the estimated tower 125 position $X'_t$ at angle $\theta_{est}$. Assuming the distance from the tower 125 to the heliostat 115 $D_t$ is known, the tower 125 offset angle θ' can be calculated to determine the true tower 125 angle and position $\theta_{tower}$, $X_t$ as follows:

$$\theta' = 2\mu(\theta_s) \tag{53}$$

$$\theta_{tower} = \theta_{est} - \theta' \tag{54}$$

$$X_t = D_t\begin{Bmatrix} \cos\theta_{tower} \\ \sin\theta_{tower} \end{Bmatrix} \tag{55}$$

There are various possible sources of uncertainty that emerge at each stage of the calculation. For example, uncertainty in the calculated camera 105 position may be affected by: 1) the ability to identify corner 140 points accurately in the image 110, which is affected by camera 105 resolution, and/or 2) uncertainty in known heliostat 115 dimensions with the true heliostat 115 dimensions. Uncertainty in the calculated tower 125 position and tracking error may be affected by 1) uncertainty in the camera 105 position, 2) the number of images 110, and/or 3) the magnitude and distribution of slope errors. Uncertainty in the calculated slope errors may be affected by 1) uncertainty in the camera 105 position, and/or 2) uncertainty in the tower 125 position. Uncertainty in calculated canting errors may be determined by uncertainty in calculated slope errors.

In the following sections, a sensitivity analysis is performed with the uncertainty sources at each step of the algorithm.

Figure 19:
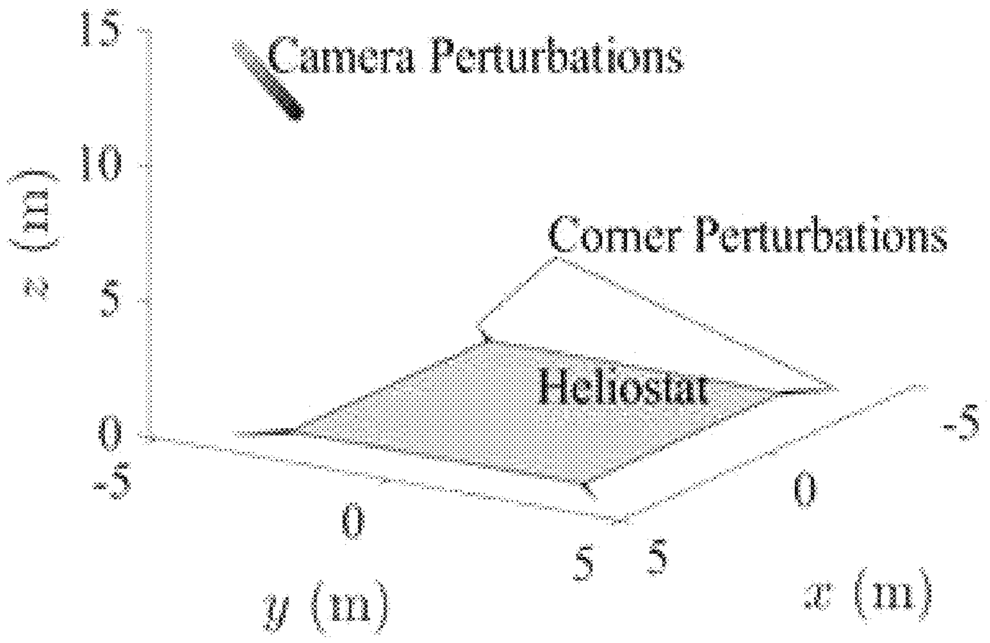
FIG. 19 illustrates how corners being perturbed outward from their true positions impacts camera position, according to some embodiments of the present disclosure.
Figure 20:
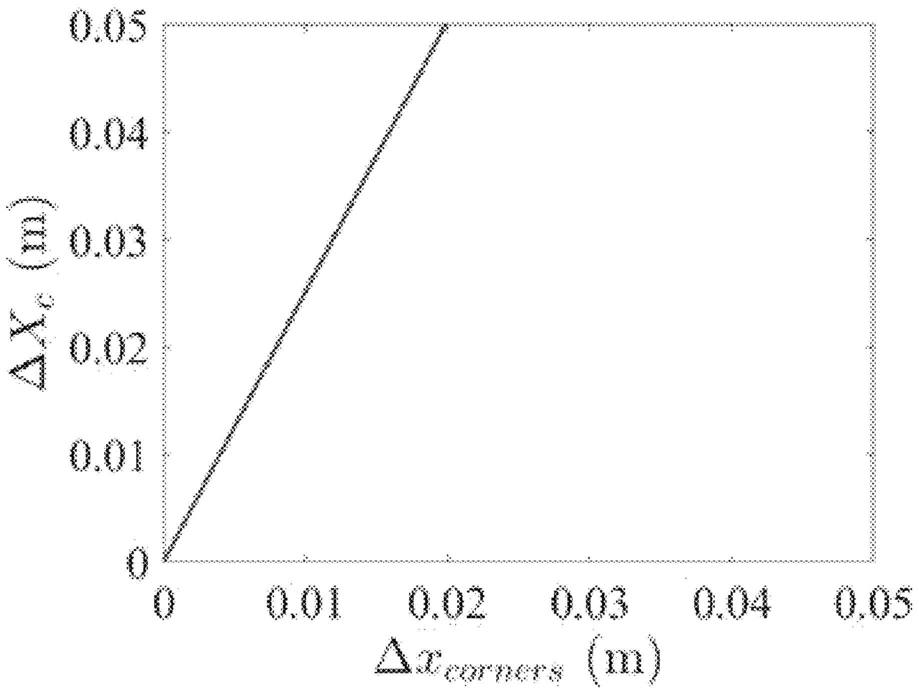
FIG. 20 illustrates how the change in camera position is affected by perturbations in the locations of the corners, according to some embodiments of the present disclosure.

The accuracy of the camera 105 position calculation depends on how accurately the corner 140 locations are known for the measured heliostat 115, and how accurately they can be identified in the image 110. FIG. 19 gives an illustration of how the calculated camera 105 position changes as the corners 140 of the heliostat 115 are perturbed outwards from their true positions. FIG. 19 shows a three-dimensional image 110 of change in camera 105 position $X_c$ with respect to perturbations outward in the locations of the corners 140 up to 1 m, while holding the identified corners 140 in the image 110 constant. FIG. 20 shows the relationship between camera 105 uncertainty and corner 140 perturbations. FIG. 20 shows the change in camera position $X_c$ with respect to perturbations in the locations of the corners 140 up to 5 cm, while holding the identified corners 140 in the image 110 constant.

The tower 125 position calculation depends on the accuracy of the calculated camera 105 position and the known reflection point positions. Pointwise slope error causes displacement in the position of the reflection point from its ideal position which increases with distance to the camera 105 and distance to the tower 125. The tower 125 position calculation depends on the face that the mean of the slope error is zero. The resolution and number of images 110 N will affect how close the mean slope error is to zero. The plots in FIG. 16 show the slope error with respect to position on the mirror 120 (x). The mean slope error is twice the tower 125 offset angle, as predicted. Define the quantity $$\frac{\Delta\theta_s}{\Delta x}$$

to be the rate of change of the slope error in the plots with respect to displacement. This rate increases as the tower offset angle θ' increases.

Figure 21:
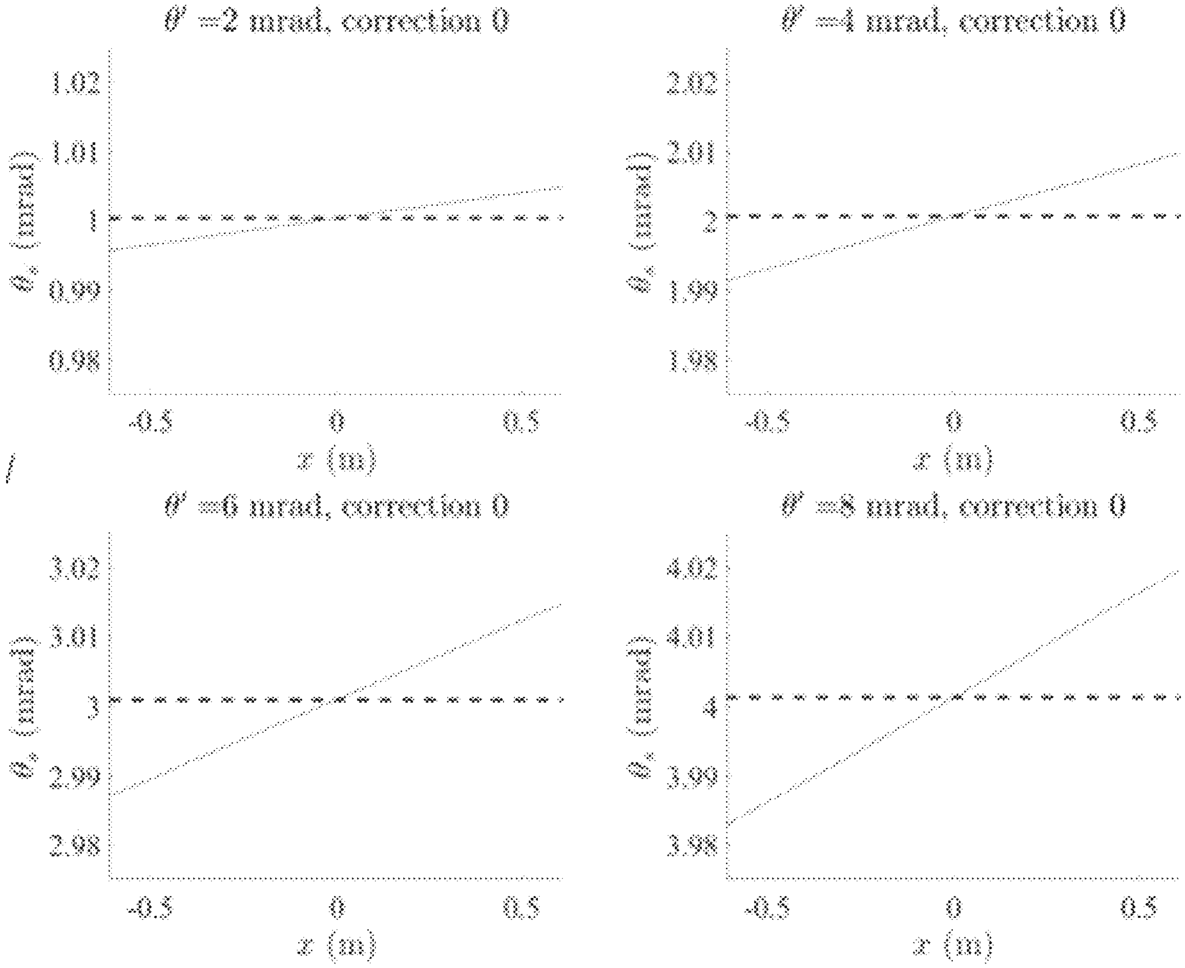
FIG. 21 illustrates the slope error profile across an ideal mirror surface for different power offset angles, according to some embodiments of the present disclosure.
Figure 22:
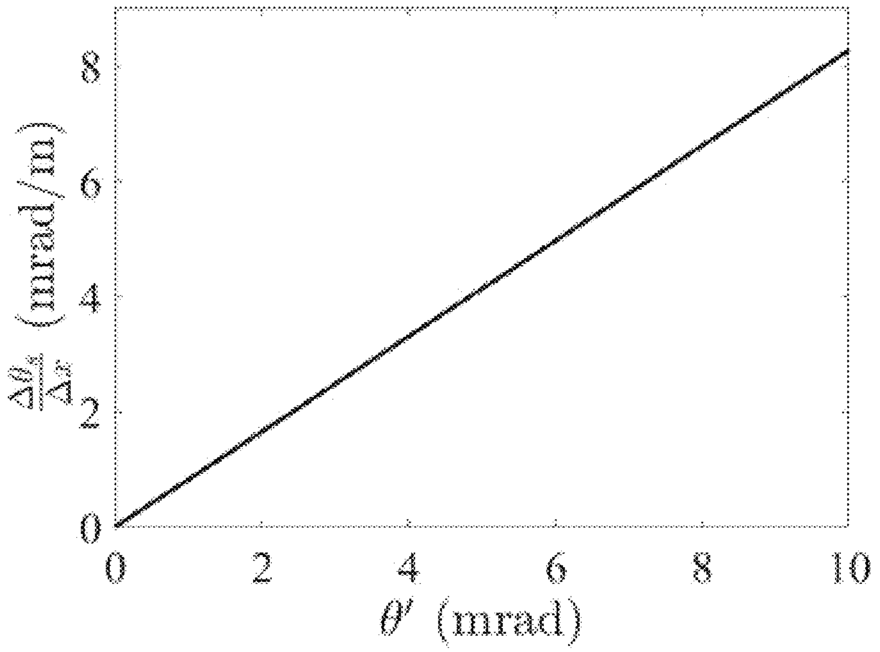
FIG. 22 illustrates the change in slope error with respect to displacement from the mirror center point with respect to a tower orientation offset angle, according to some embodiments of the present disclosure.

. FIG. 21 shows the slope error profile across ideal mirror surface for different tower offset angels. FIG. 22 shows the change in slope error with respect to displacement from the mirror center point with respect to tower orientation offset θ'.

Figure 23:
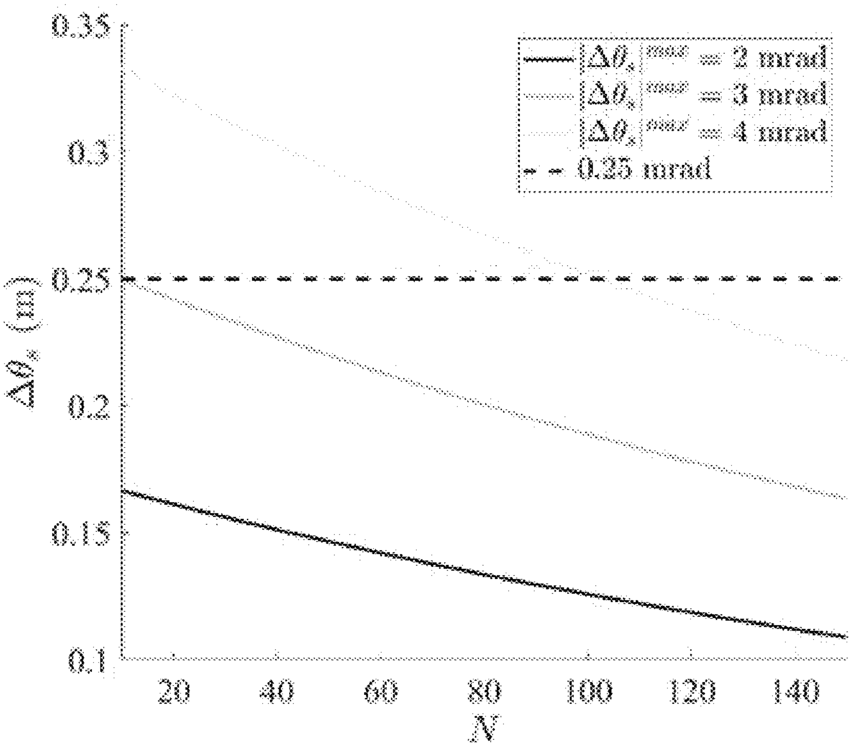
FIG. 23 illustrates the slope error uncertainty with respect to the number of images for different possible slope error magnitudes on the mirror surface, according to some embodiments of the present disclosure.

A sufficient number of images N may be used to ensure the slope error distribution is centered about zero. FIG. 23 shows the slope error uncertainty with respect to the number of images 110 N for different maximum possible slope error magnitudes on the slope surface $|\Delta\theta_s|^{max}$. FIG. 23 shows the minimum number of images 110 to achieve 0.25 mrad of slope error uncertainty given different maximum possible slope error magnitudes on the slope surface $|\Delta\theta_s|^{max}$.

Figure 24A:
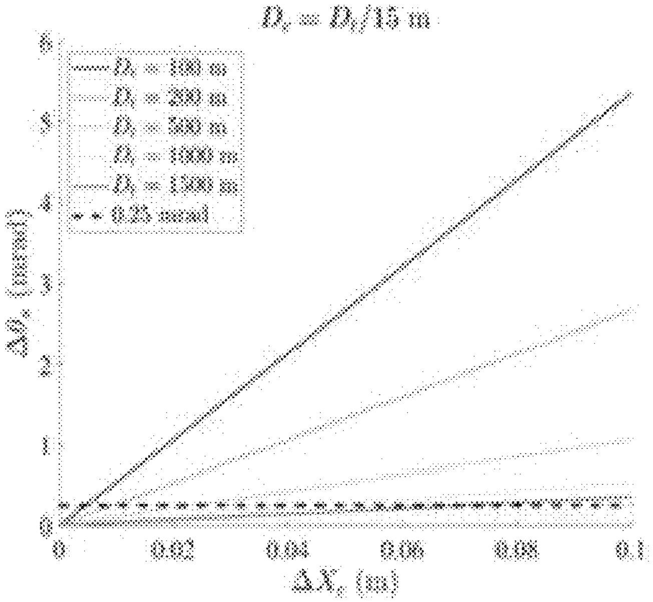
FIG. 24A illustrates the uncertainty in calculating mean slope error with respect to camera position uncertainty, according to some embodiments of the present disclosure.
Figure 24B:
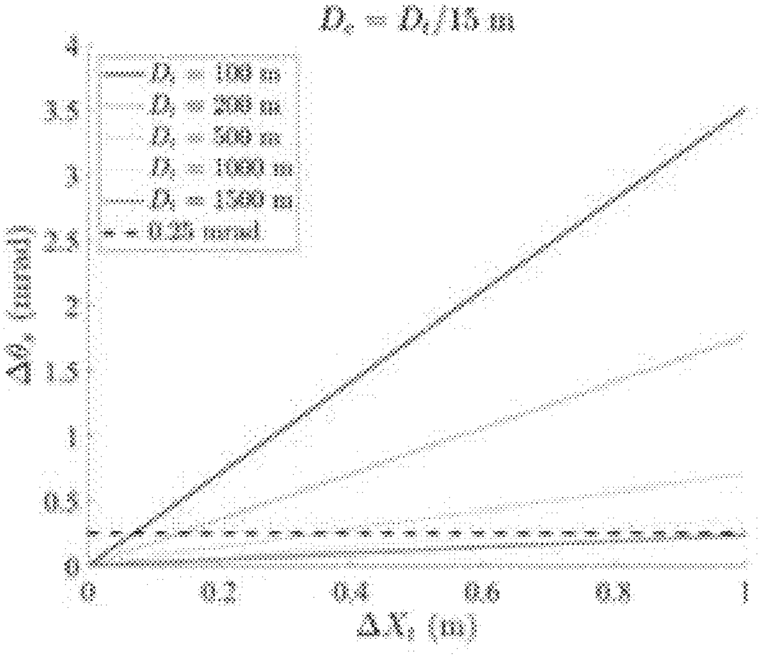
FIG. 24B illustrates the uncertainty in calculating mean slope error with respect to tower position uncertainty, according to some embodiments of the present disclosure.
Figure 25A:
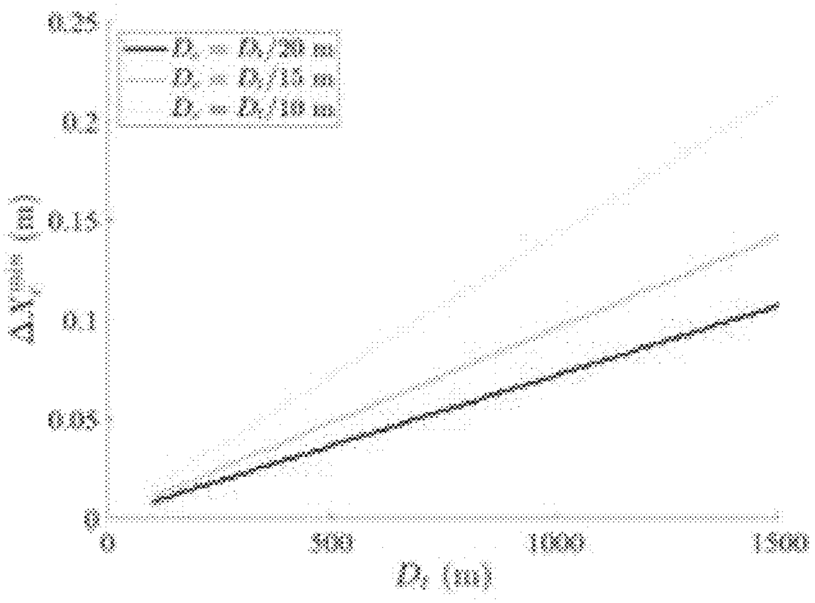
FIG. 25A illustrates the minimum suggested camera position uncertainty given different camera distances to achieve 0.25 mrad of slope error uncertainty, according to some embodiments of the present disclosure.
Figure 25B:
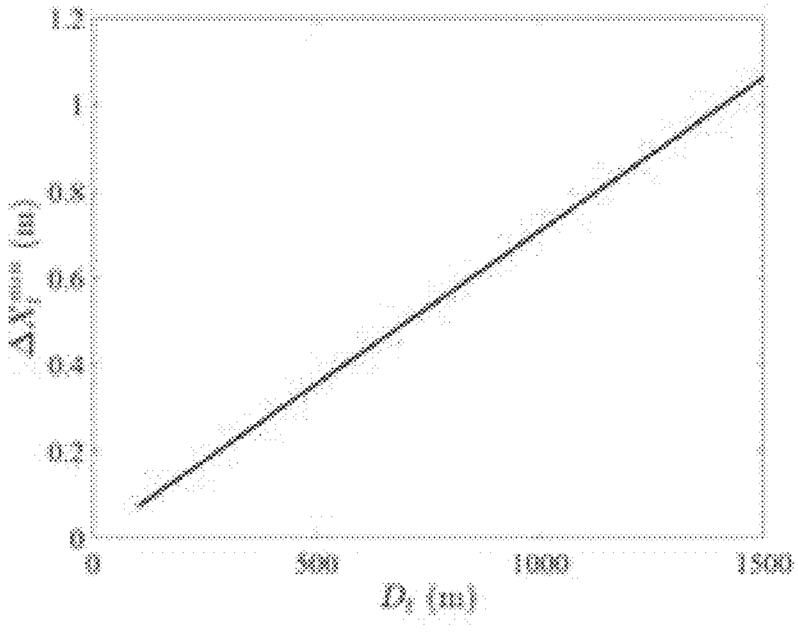
FIG. 25B illustrates the minimum suggested tower position uncertainty with respect to tower distance to achieve 0.25 mrad of slope error uncertainty, according to some embodiments of the present disclosure.

Uncertainty in the slope error depends directly on the uncertainty of the calculated camera 105 and tower 125 positions. FIGS. 24A-B shows how slope error uncertainty increases with uncertainty in the camera 105 and tower 125 position. FIG. 24A shows the uncertainty in calculating mean slope error with respect to camera 105 position uncertainty while allowing distance from the tower 125 to the heliostat 115 to vary. FIG. 24B shows the uncertainty in calculating mean slope error with respect to tower 125 position uncertainty while allowing distance from the tower 125 to the heliostat 115 to vary. Uncertainty in the camera 105 position has a larger impact on the slope error calculation, since the distance of the camera 105 to the heliostat 115 will be small relative to the distance between the tower 125 and the heliostat 115. FIGS. 25A-B shows the minimum suggested camera 105 and tower 125 uncertainties to achieve 0.25 mrad in slope error uncertainty. FIG. 25A shows the minimum suggested camera 105 position uncertainty $\Delta X_c^{min}$ given different camera 105 distances with respect to tower 125 distance to achieve 0.25 mrad of slope error uncertainty. FIG. 25B shows minimum suggested tower 105 position uncertainty $\Delta X_t^{min}$ (right) with respect to tower 125 distance to achieve 0.25 mrad of slope error uncertainty.

Figure 26A:
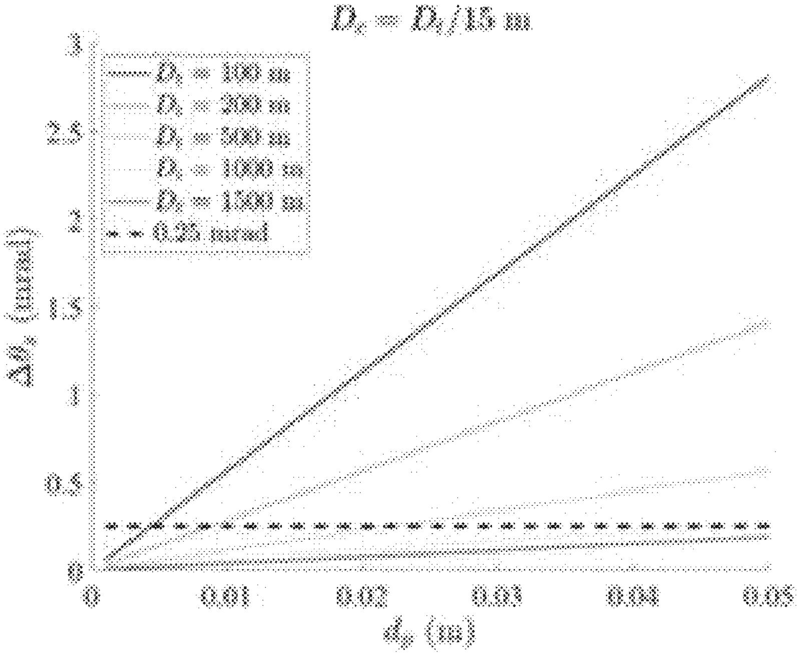
FIG. 26A illustrates slope error uncertainty with respect to resolution defined by the distance on the heliostat surface spanned by one pixel, according to some embodiments of the present disclosure.
Figure 26B:
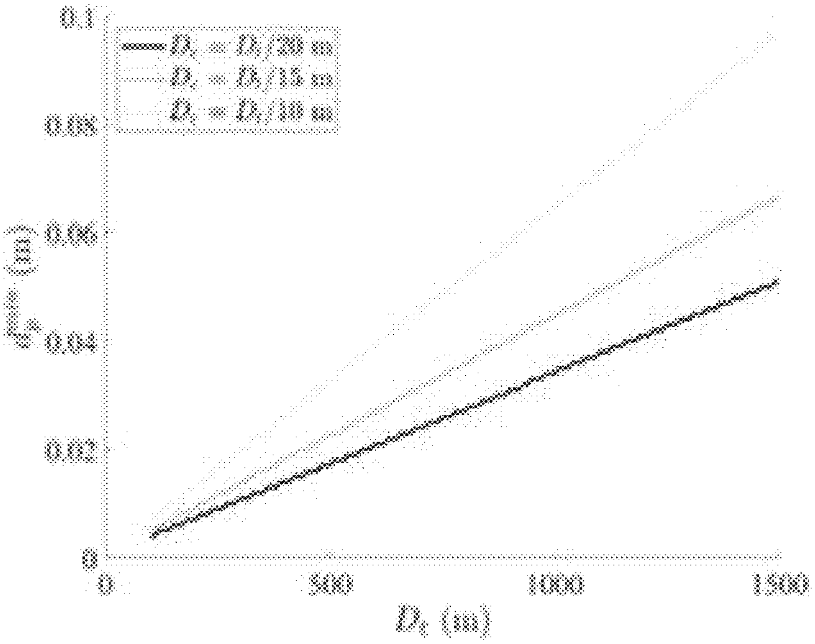
FIG. 26B illustrates suggested resolution uncertainty with respect to tower distance to achieve 0.25 mrad of slope error uncertainty for different camera distances, according to some embodiments of the present disclosure.

The camera 105 resolution will impact the uncertainty in the positions of the reflected tower edge points on the mirror surface, which directly impacts the uncertainty of the slope error calculation. The resolution on the heliostat surface was defined by the quantity $d_p$, which describes the distance spanned by one pixel on the mirror surface. The value $d_p$ will depend on the camera resolution, the focal length, and the distance of the camera from the heliostat. FIGS. 26A-B illustrates the resolution measurements to achieve 0.25 mrad of slope error uncertainty. FIG. 26A shows slope error uncertainty with respect to resolution defined by the distance on the heliostat surface spanned by one pixel $d_p$ for different camera 105 distances. FIG. 26B shows suggested resolution uncertainty with respect to tower distance to achieve 0.25 mrad of slope error uncertainty for different camera 105 distances.

Figure 27:
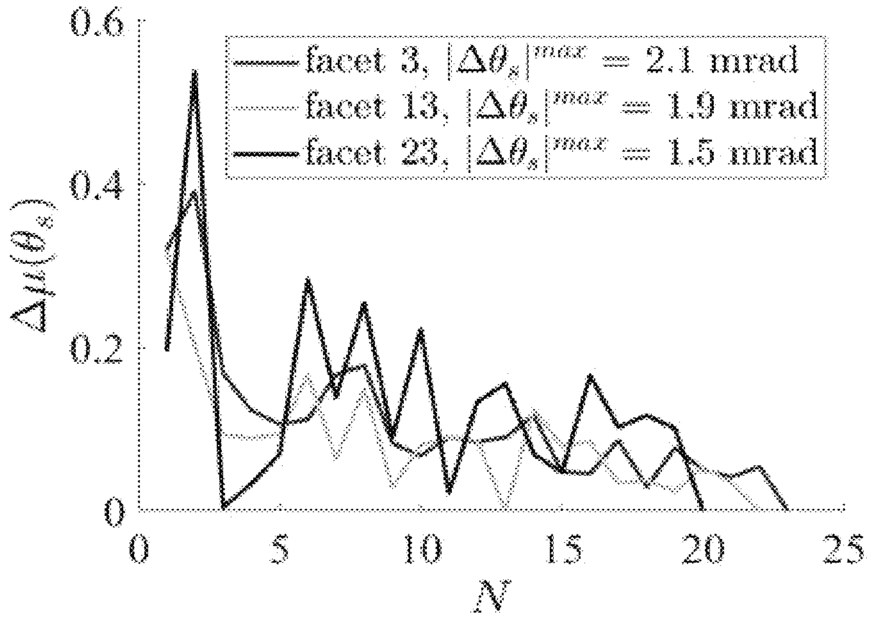
FIG. 27 illustrates how deviations in the mean slope error vary as the number of images increases for three representative mirrors on a measured heliostat, according to some embodiments of the present disclosure.
Figure 28:
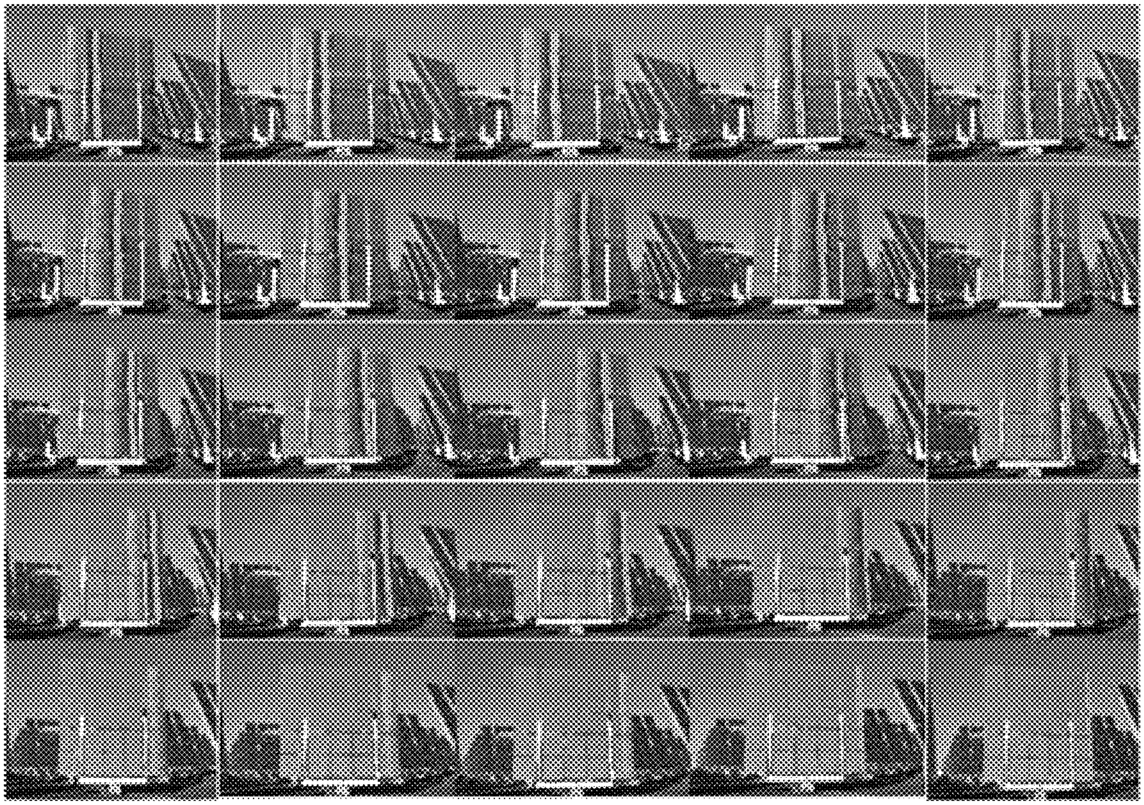
FIG. 28 illustrates original images captured at a measured heliostat, according to some embodiments of the present disclosure.

FIG. 27 shows how deviations in the mean slope error vary as the number of images N increases for three representative mirrors on the measured heliostat. The y-axis shows the uncertainty in mean slope error $\mu(\theta_s)$ for a subset of images from the mean slope error when using the maximum number of images. A total of 20-23 images were collected for each of the three facets. FIG. 27 shows mean slope error uncertainty $\Delta\mu(\theta_s)$ for a subset of N images when compared to the mean slope error for the total image set with respect to increasing N for three representative mirrors. A total of 20-23 images were collected for each mirror. Table 7 shows properties of a measured heliostat. FIG. 28 shows the original images taken at the heliostat.

TABLE 7

| Properties of measured heliostat | |
|---|---|
| Identifier | 5W3 |
| NSTTF coordinates | (−24.36, 57.91, 3.61) |
| Focal length | 75 m |
| Orientation | 185.05° azimuth, 3.99° elevation |

Figure 29:
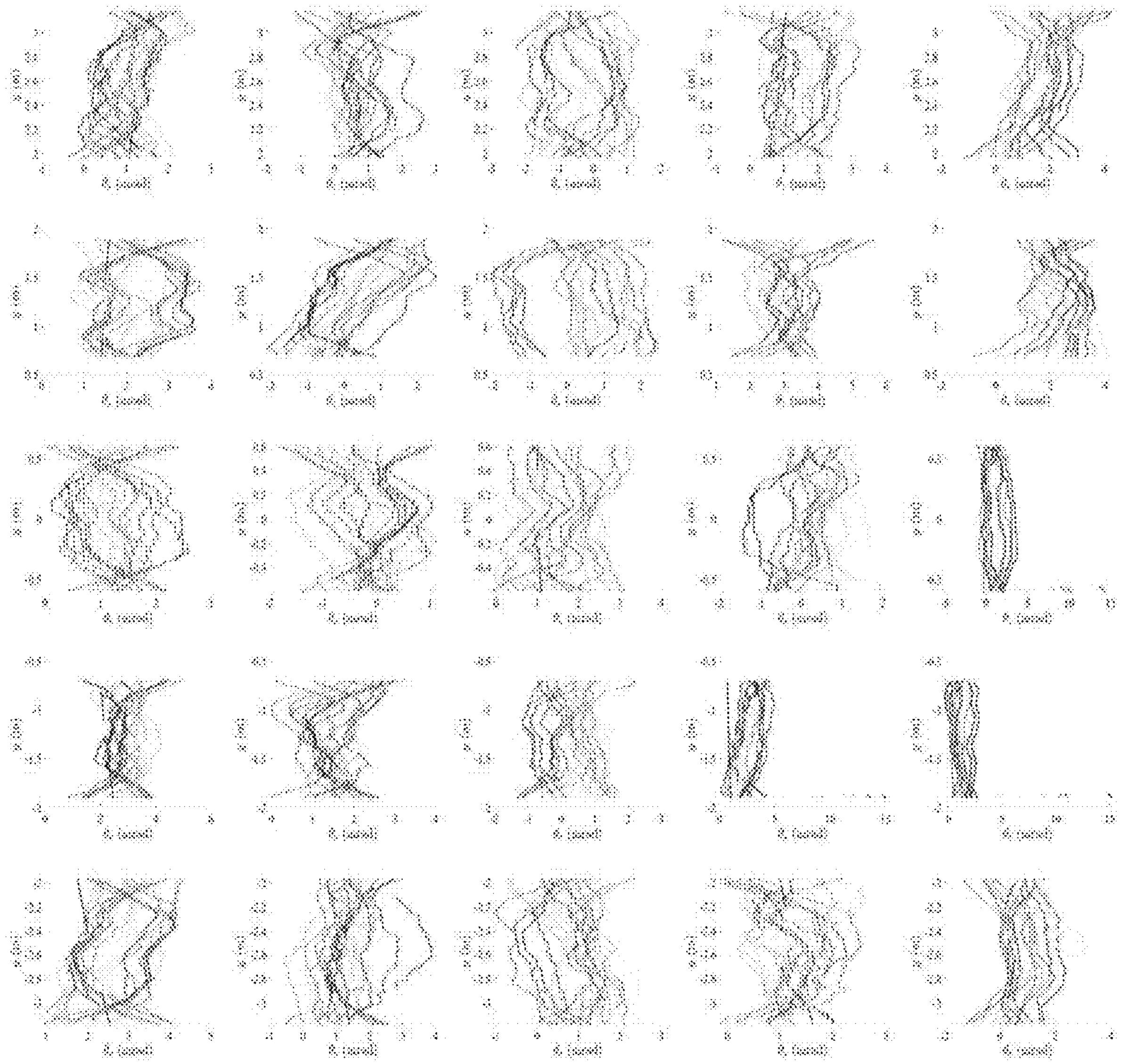
FIG. 29 illustrates the slope error with respect to the y-coordinate of each reflection point along a reflected tower edge, according to some embodiments of the present disclosure.
Figure 30:
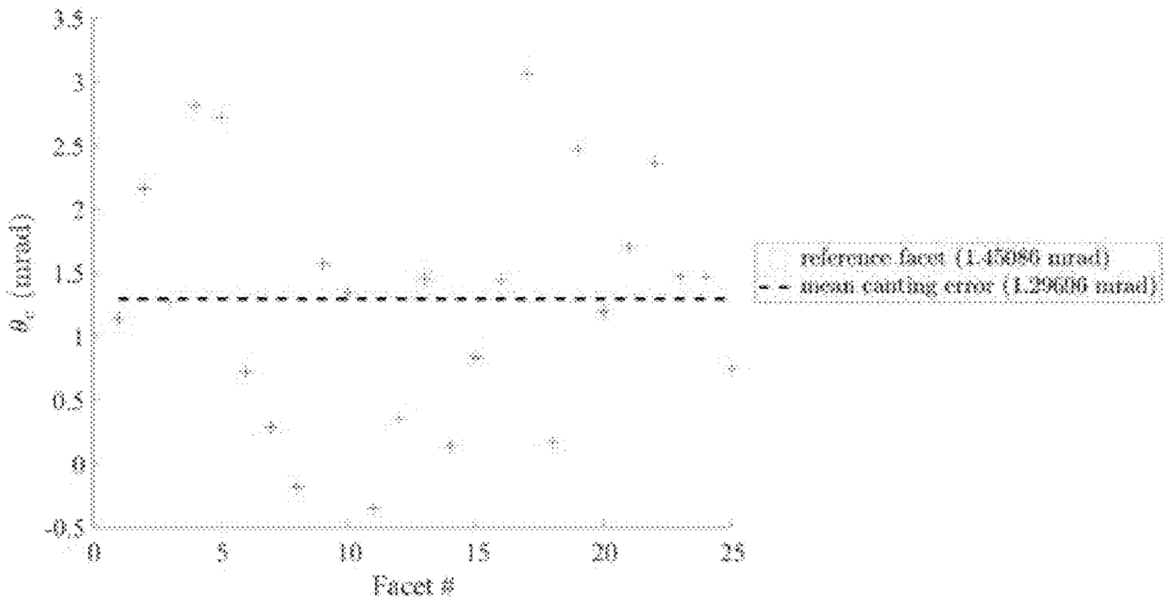
FIG. 30 illustrates the canting error for each mirror calculated from the slope error results in FIG. 29, according to some embodiments of the present disclosure.

FIG. 29 shows the slope error $\theta_s$ along the x-axis with respect to the y-coordinate of each reflection point along the reflected tower edge 135. The layout of the plots matches the layout of the mirrors 120 of the 5×5 NSTTF heliostat 115. Different shaded lines give different camera 105 positions. FIG. 30 shows the canting error for each mirror 120 calculated from slope error results.

The tracking error of the NSTTF heliostat is based on the position of the center reference mirror 120 (No. 13), which is centered at the rotation axis. Applying the recorded heliostat azimuthal angle, the reference mirror 120 had a calculated mean slope error of 1.297 mrad. Applying the method described in FIG. 21 the heliostat azimuthal angle was corrected by 2.59 mrad. After this correction, the calculated mean error became 0.009 mrad.

References herein to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, the terms "substantially" and/or "approximately" are used to indicate that exact values are not necessarily attainable. In some embodiments, the terms "substantially" and/or "approximately" are defined as approaching a specific numeric value or target within 20%, 15%, 10%, 5%, or within 1% of the value or target. In further embodiments, the terms "substantially" and/or "approximately" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments, the term "about" is used to indicate an uncertainty limit of less than or equal to ±20%, ±15%, ±10%, ±5%, or ±1% of a specific numeric target. In some embodiments, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

The invention claimed is:

1. A method for increasing solar energy delivered to a tower receiver by a heliostat, the method comprising:

capturing an image of a reflection of the tower receiver in a mirror of the heliostat using a camera having a position;

calculating an optical error of the heliostat based on the image and the position of the camera; and adjusting the heliostat to deliver more solar energy to the tower receiver based on the optical error; wherein:

the optical error comprises at least one of a slope error, a canting error, or a tracking error, and the adjusting reduces the optical error and increases the solar energy delivered to the tower receiver.

2. The method of claim 1, wherein the calculating further comprises:

identifying a feature in the image.

3. The method of claim 2, wherein the feature comprises a corner of the heliostat in the image.

4. The method of claim 3, further comprising:

determining the position of the camera, wherein:

the determining comprises defining a coordinate system based on the corner of the heliostat; and using collinearity equations in the coordinate system to solve for the position of the camera.

5. The method of claim 2, wherein the feature is the reflection of the tower receiver and the identifying comprises:

mapping a plurality of pixels comprising the image in physical space;

sorting the plurality of pixels into a first class and a second class;

scanning the plurality of pixels to determine a location where a pixel of the first class is adjacent to a pixel of the second class, and identifying the location as the feature.

6. The method of claim 5, wherein:

the image is in greyscale, the first class comprises pixels which are black, and the second class comprises pixels which are white.

7. The method of claim 5, wherein:

the optical error is slope error and the calculating comprises:

identifying a first point along the feature;

calculating a first normal vector from the point with the mirror at a first orientation;

determining a second orientation of the mirror;

calculating a second normal vector from a second point on the second orientation of the mirror; and comparing the first normal vector and the second normal vector to determine the slope error.

8. The method of claim 7, wherein:

the optical error is canting error and the calculating comprises:

determining the slope error for a plurality of points on the mirror, and averaging the slope error for the plurality of points to determine the canting error.

9. The method of claim 8, wherein:

the optical error is tracking error and the calculating comprises:

comparing the canting error of the mirror to the second orientation to determine a tracking error.

10. The method of claim 9, wherein:

the adjusting is approximately equivalent to the tracking error.

11. A system for maximizing the solar energy delivered to a tower receiver by a heliostat, the system comprising:

the tower receiver comprising a feature;

the heliostat comprising a mirror having a first orientation relative to the tower receiver;

a camera configured to obtain an image of a tower receiver reflection in the mirror; and a processor configured to receive the image and calculate an optical error of the heliostat based on the image, wherein:

the optical error comprises at least one of a slope error, a canting error, or a tracking error, and the processor is configured to adjust the heliostat to a second orientation to minimize the optical error, resulting in the heliostat delivering more solar energy to the tower receiver.

12. The system of claim 11, further comprising:

an unmanned aerial vehicle configured to support the camera.

13. The system of claim 11, wherein:

the mirror comprises a corner, and the processor is configured to:

locate the corner in the image, define a coordinate system based on the corner; and use collinearity equations to determine a position of the camera.

14. The system of claim 13, wherein the processor is configured to:

identify a point along the tower receiver reflection of the feature, calculate a first normal vector from the point with the mirror at a first orientation, determine a second orientation of the mirror, calculate a second normal vector from the second orientation of the mirror, and compare the first normal vector and the second normal vector to determine the slope error.

15. The system of claim 14, wherein the processor is configured to:

calculate the slope error at a plurality of points on the mirror, and average the slope error for the plurality of points to determine the canting error.

16. The system of claim 15, wherein the processor is configured to:

compare the canting error to the first orientation to determine the tracking error.

* * * * *